(12) United States Patent
Iizuka et al.

(10) Patent No.: US 6,999,864 B2
(45) Date of Patent: Feb. 14, 2006

(54) APPARATUS AND METHOD FOR ESTIMATING RESIDUAL GAS AMOUNT OF INTERNAL COMBUSTION ENGINE, AND APPARATUS AND METHOD FOR CONTROLLING INTAKE AIR AMOUNT OF INTERNAL COMBUSTION ENGINE USING ESTIMATED RESIDUAL GAS AMOUNT

(75) Inventors: Isamu Iizuka, Atsugi (JP); Kenichi Machida, Atsugi (JP); Hirokazu Shimizu, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/617,723

(22) Filed: Jul. 14, 2003

(65) Prior Publication Data

US 2004/0015287 A1 Jan. 22, 2004

(30) Foreign Application Priority Data

Jul. 15, 2002 (JP) ............................. 2002-205877
Jul. 15, 2002 (JP) ............................. 2002-205878
Nov. 28, 2002 (JP) ............................. 2002-346142

(51) Int. Cl.
*G05D 1/00* (2006.01)

(52) U.S. Cl. .............. 701/103; 701/110; 701/112; 701/113; 701/104; 701/105; 701/108; 701/109; 123/90.15; 123/90.18; 123/90.31

(58) Field of Classification Search ........ 701/103–110, 701/112, 113; 123/90.15–90.18, 90.31
See application file for complete search history.

(56) References Cited

U.S. PATENT DOCUMENTS 5,074,260 A 12/1991 Yagi et al.
(Continued)

FOREIGN PATENT DOCUMENTS

DE 40 13 633 C2 10/1990
(Continued)

*Primary Examiner*—Tony M. Argenbright
*Assistant Examiner*—Johnny H. Hoang
(74) *Attorney, Agent, or Firm*—Foley & Lardner LLP

(57) ABSTRACT

In an internal combustion engine provided with a variable valve mechanism that variably controls at least an operating characteristic (valve lift amount and the like) of an intake valve, a valve opening area AWm at a valve overlap time is calculated based on a valve lift amount (VCS-ANGL) and opening timing IVO of the intake valve, and a spit-back gas amount Wm at the valve overlap time is calculated based on the valve opening area AWm. On the other hand, a volume flow ratio (basic actual engine volume flow ratio) RQH0VEL1 in the intake valve, equivalent to an actual intake air amount of the engine, is calculated based on the valve lift amount and closing timing of the intake valve, and a basic residual gas amount Wcyl is calculated based on the basic actual engine volume flow ratio RQH0VEL1. Then, a resultant obtained by adding the spit-back gas amount Wm and the basic residual gas amount Wcyl, is set as a total residual gas amount of the engine. Further, in the case where an intake air amount control is performed by the variable valve mechanism, a target valve operating characteristic is set based on a target intake air amount which is set according to an operating condition of the engine, and the variable valve mechanism is controlled so that the valve operating characteristic of the intake valve reaches the target valve operating characteristic. At the moment, by executing a residual gas based correction to set the target valve operating characteristic, a high accurate intake air amount control is realized.

48 Claims, 28 Drawing Sheets

U.S. PATENT DOCUMENTS

| | | | | |
|---|---|---|---|---|
| 5,456,226 A | * | 10/1995 | Doll | 123/90.16 |
| 6,000,375 A | * | 12/1999 | Isobe | 123/322 |
| 6,408,806 B1 | * | 6/2002 | Sugiyama et al. | 123/90.15 |
| 6,412,458 B1 | * | 7/2002 | Kawasaki et al. | 123/90.15 |
| 6,640,758 B1 | * | 11/2003 | Ashida | 123/90.15 |
| 6,659,083 B1 | * | 12/2003 | Gaessler et al. | 123/443 |
| 6,769,404 B1 | * | 8/2004 | Aoyama et al. | 123/406.29 |

FOREIGN PATENT DOCUMENTS

| | | |
|---|---|---|
| DE | 195 81 459 T1 | 2/1997 |
| JP | 2001-041013 A | 2/2001 |
| JP | 2001-221105 A | 8/2001 |
| WO | WO 95/18917 A1 | 7/1995 |

* cited by examiner (b-2) SETTING OF VALVE UPSTREAM PRESSURE BASED CORRECTION VALUE "KMANIP"

(c) SETTING OF VTC TARGET (PHASE) ANGLE "TGVTC"

(d-2) CALCULATION OF INTAKE VALVE OPENING BASED CORRECTION VALUE "KAVEL"

(d-3) CALCURATION OF PRESSURE RATIO(Pm1/Pa) AT THE TIME WHEN VEL OPERATES

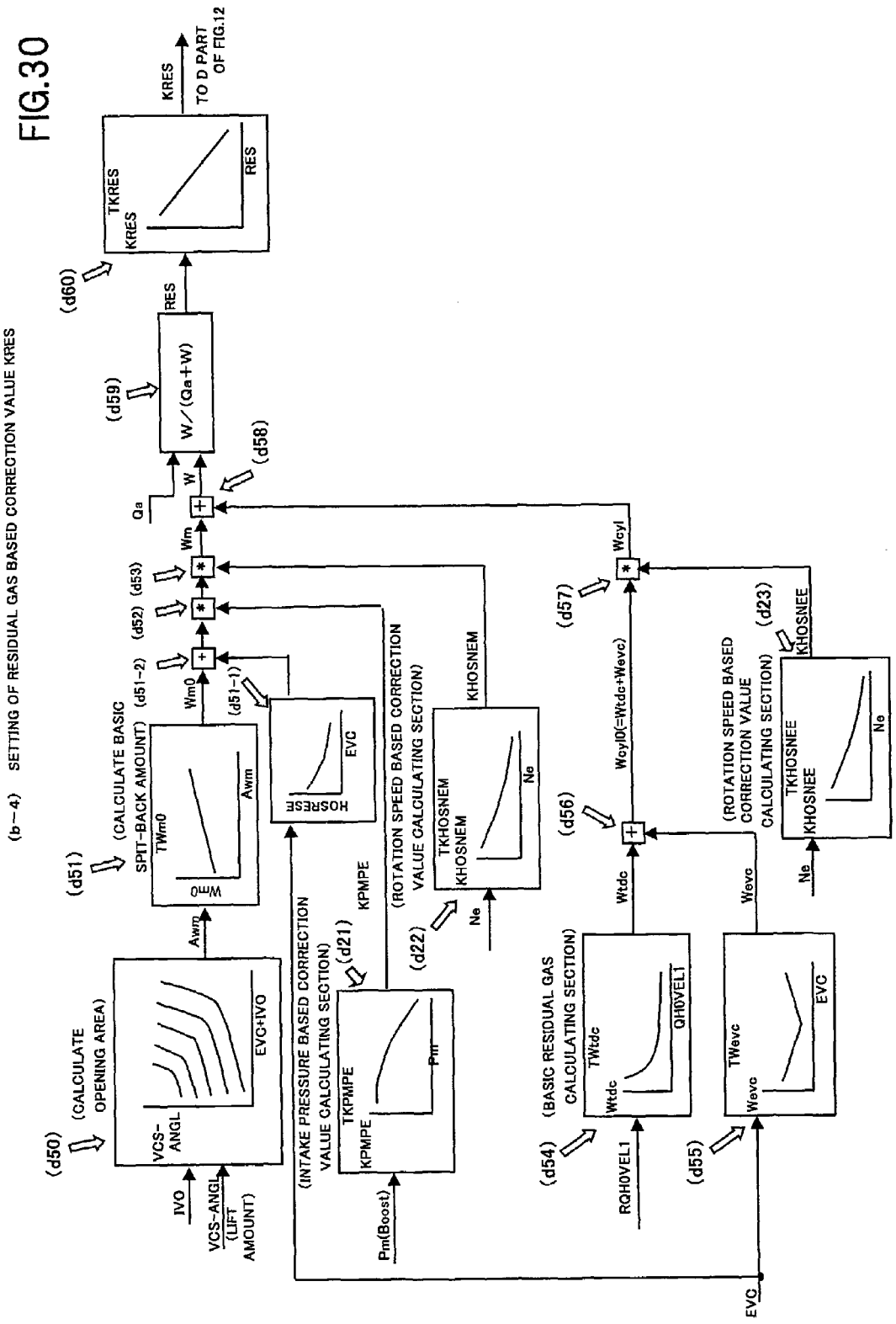

APPARATUS AND METHOD FOR ESTIMATING RESIDUAL GAS AMOUNT OF INTERNAL COMBUSTION ENGINE, AND APPARATUS AND METHOD FOR CONTROLLING INTAKE AIR AMOUNT OF INTERNAL COMBUSTION ENGINE USING ESTIMATED RESIDUAL GAS AMOUNT

FIELD OF THE INVENTION

The present invention relates to a technique for estimating a residua gas amount, in an internal combustion engine provided with a variable valve mechanism, which varies at least an operating characteristic of an intake valve of the engine, and also controlling an intake air amount by the variable valve mechanism, using the estimated residual gas amount.

RELATED ART OF THE INVENTION

Heretofore, there has been known an estimating apparatus, as disclosed in Japanese Unexamined Patent Publication No. 2001-221105, which estimates a residual gas amount of an engine.

According to such an estimating apparatus, in an internal combustion engine provided with a variable valve mechanism capable of variably controlling closing timing of an exhaust valve, a basic value of a residual gas amount is calculated based on closing timing of the exhaust valve and an engine rotation speed, and if there is no valve overlap, the basic value is estimated as the residual gas amount, while at a valve overlap, the basic value is increasingly corrected based on a period of valve overlap time, a center crank angle position thereof, and a spit-back portion during the valve overlap time according to an intake pressure, to estimate the residual gas amount.

In an internal combustion engine provided with a variable valve mechanism which varies a valve lift amount of an intake valve, since an intake air amount is changed depending on differences between valve opening areas due to a change in valve lift amount of the intake valve even with the same closing timing of exhaust valve and the same engine rotation speed, with this change, a cylinder residual gas amount is also changed (that is, the basic value cannot be calculated with high accuracy).

Further, even with the same period of valve overlap time and the same center crank angle position thereof, depending on the differences between valve opening areas due to the change in valve lift amount of the intake valve, a spit-back gas amount during the valve overlap time is changed (that is, a spit-back portion during the valve overlap time cannot be calculated with high accuracy).

Consequently, in an internal combustion engine provided with a variable valve mechanism, which varies a valve lift amount of an intake valve, the conventional technique has a problem in that the residual gas amount cannot be estimated with high accuracy.

SUMMARY OF THE INVENTION

The present invention has been achieved in view of the above problems and has an object to estimate with high accuracy a residual gas amount even in the case where a valve lift amount of an intake valve is variable. Further, the present invention has an object to control a variable valve mechanism using the estimated residual gas amount thereby realizing a high accurate throttle-less operation (an intake air amount control mainly by the variable valve mechanism).

In order to achieve the above objects, a first aspect of the present invention is constituted so that, in an internal combustion engine provided with a variable valve mechanism which varies at least an operating characteristic of an intake valve, a valve opening area during a valve overlap time is calculated based on the valve operating characteristic which is varied by the variable valve mechanism, and a residual gas amount of the engine is calculated based on the calculated valve opening area and an actual intake air amount of the engine.

Here, the valve opening area during the valve overlap time is basically calculated as each of opening areas of intake and exhaust valves based on the valve operating characteristic (opening/closing timing, a valve lift amount and the like), but, for more simplicity, may be calculated as the opening area of the intake valve.

Further, the actual intake air amount of the engine is basically calculated based on the operating characteristic of the intake valve, but, for more simplicity, may be calculated based on a detection value of an intake air amount detecting sensor (an air flow meter and the like).

A second aspect of the present invention is constituted so that, in an internal combustion engine provided with a variable valve mechanism, which varies at least an operating characteristic of an intake valve, when performing an intake air amount control mainly by the variable valve mechanism, a target intake air amount equivalent to a target torque is set based on an operating condition of the engine, a valve opening area during a valve overlap time is calculated based on the valve operating characteristic which is varied by the variable valve mechanism, a residual gas amount of the engine is calculated based on the valve opening area during the valve overlap time and an actual intake air amount of the engine, a target valve operating characteristic is set based on the target intake air amount and the residual gas amount of the engine, and the variable valve mechanism is controlled so that the operating characteristic of the intake valve reaches the target valve operating characteristic.

Note, the residual gas amount of the engine to be used here is calculated in the first aspect of the present invention.

The other objects and features of this invention will become understood from the following description with accompanying drawings.

BRIEF EXPLANATION OF THE DRAWINGS

FIG. 30 is a block diagram showing the setting of the residual gas based correction value KRES (calculation of the residual gas amount).

DETAILED DESCRIPTION OF THE EMBODIMENT

Embodimens of the present invention will be described based on the drawings.

(First Embodiment)

Figure 1:
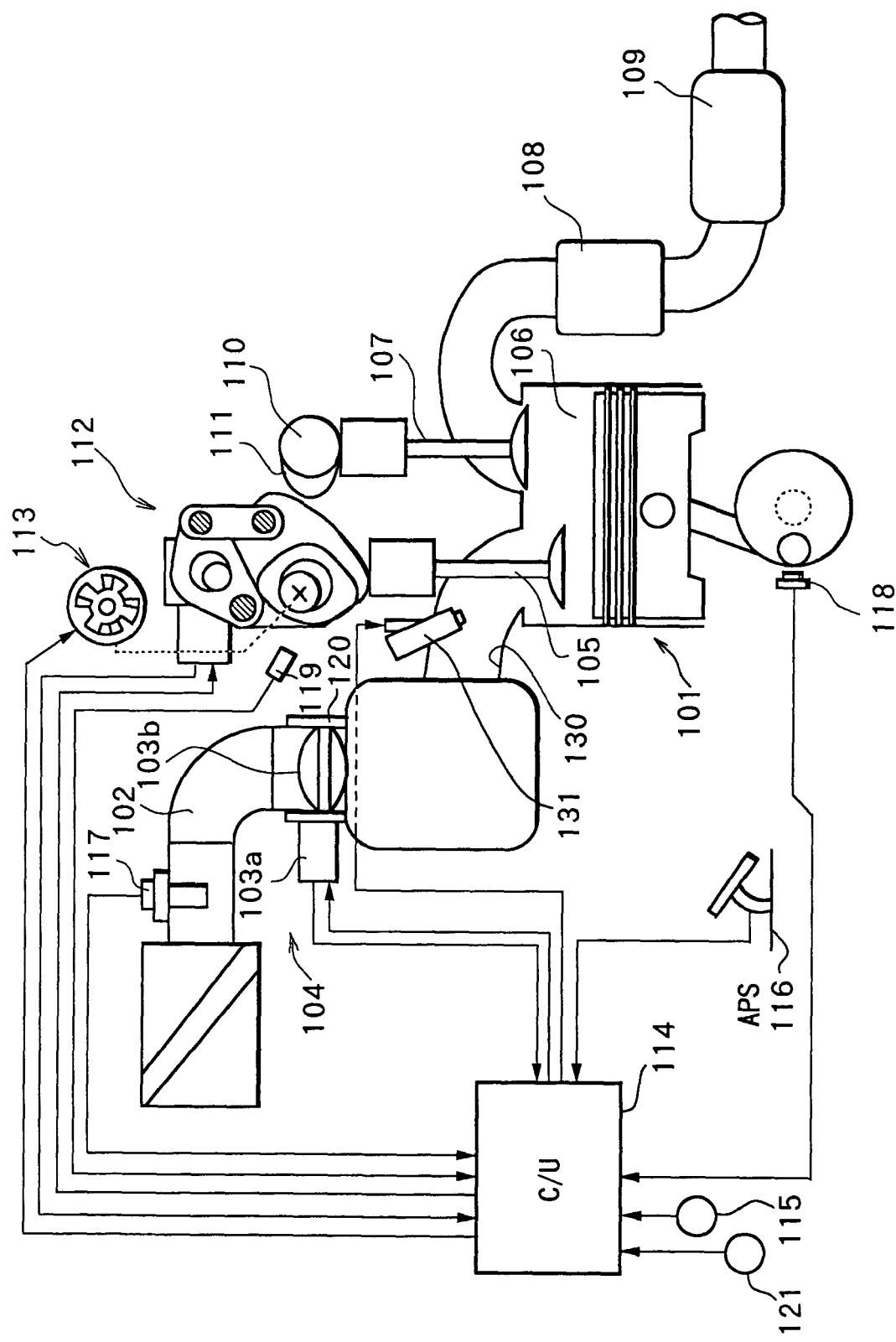
FIG. 1 is a view showing a system structure of an internal combustion engine in a first embodiment of the present invention.

FIG. 1 is a structural diagram of an internal combustion engine for vehicle according to a first embodiment of the present invention. In FIG. 1, in an intake passage 102 of an internal combustion engine 101, an electronically controlled throttle 104 is disposed for driving a throttle valve 103b to open and close by a throttle motor 103a. Air is sucked into a combustion chamber 106 via electronically controlled throttle 104 and an intake valve 105.

A combusted exhaust gas is discharged from combustion chamber 106 via an exhaust valve 107, purified by an exhaust purification catalyst 108, and then emitted into the atmosphere via a muffler 109.

Exhaust valve 107 is driven by a cam 111 axially supported by an exhaust side camshaft 110, while keeping a valve lift amount and a valve operating angle thereof constant. On the contrary, a valve lift amount and a valve operating angle of intake valve 105 are successively varied by a VEL (Variable valve Event and Lift mechanism) 112 serving as a variable valve mechanism, and valve timing thereof is successively varied by a VTC (Valve Timing Control mechanism) 113 serving as a variable valve timing mechanism. Further, the constitution may be such that an operating characteristic (valve lift amount, valve operating angle, valve timing) of exhaust valve 107 is varied together with an operating characteristic of intake valve 105.

A control unit (C/U) 114 incorporating therein a microcomputer, receives various detection signals from a water temperature sensor 115 detecting a cooling water temperature Tw of engine 101, an accelerator opening sensor APS 116 detecting an accelerator opening, an air flow meter 117 detecting an intake air amount (mass flow) Qa, a crank angle sensor 118 taking out a rotation signal from a crankshaft, a cam sensor 119 detecting a rotation position (phase angle) of an intake side camshaft, a throttle sensor 120 detecting an opening TVO of throttle valve 103b, a pressure sensor 121 detecting a pressure inside a cylinder and the like.

C/U 114 controls electronically controlled throttle 104, VEL 112 and VTC 113 based on received detection signals, so that target valve timing which is set according to an engine operating condition can be obtained, and also so that a target intake air amount corresponding to the accelerator opening can be obtained based on the opening of throttle valve 103b and the operating characteristic of intake valve 105.

Specifically, the opening of throttle valve 103b is controlled so as to generate a constant negative pressure (target Boost: for example, −50 mmHg) for the canister purging and the blowby gas processing, while controlling the intake air amount by controlling the valve lift amount (and the valve operating angle) of intake valve 105 by VEL 112.

Note, under an operating condition where there is no negative pressure request, the intake air amount is controlled only by VEL 112, while keeping throttle valve 103b fullopened. In the case where the intake air amount cannot be controlled only by VEL 112, the drive of VEL 112 is controlled and throttle valve 103b is also controlled.

In C/U 114, an engine rotation speed Ne is calculated based on the rotation signal output from crank angle sensor 118. Further, an electromagnetic fuel injection valve 131 is disposed on an intake port 130 on the upstream side of intake valve 105 of each cylinder. Fuel injection valve 131 injects fuel adjusted at a predetermined pressure toward intake valve 105 when driven to open by an injection pulse signal from C/U 114.

Here, a structure of VEL 112 will be described.

Figure 2:
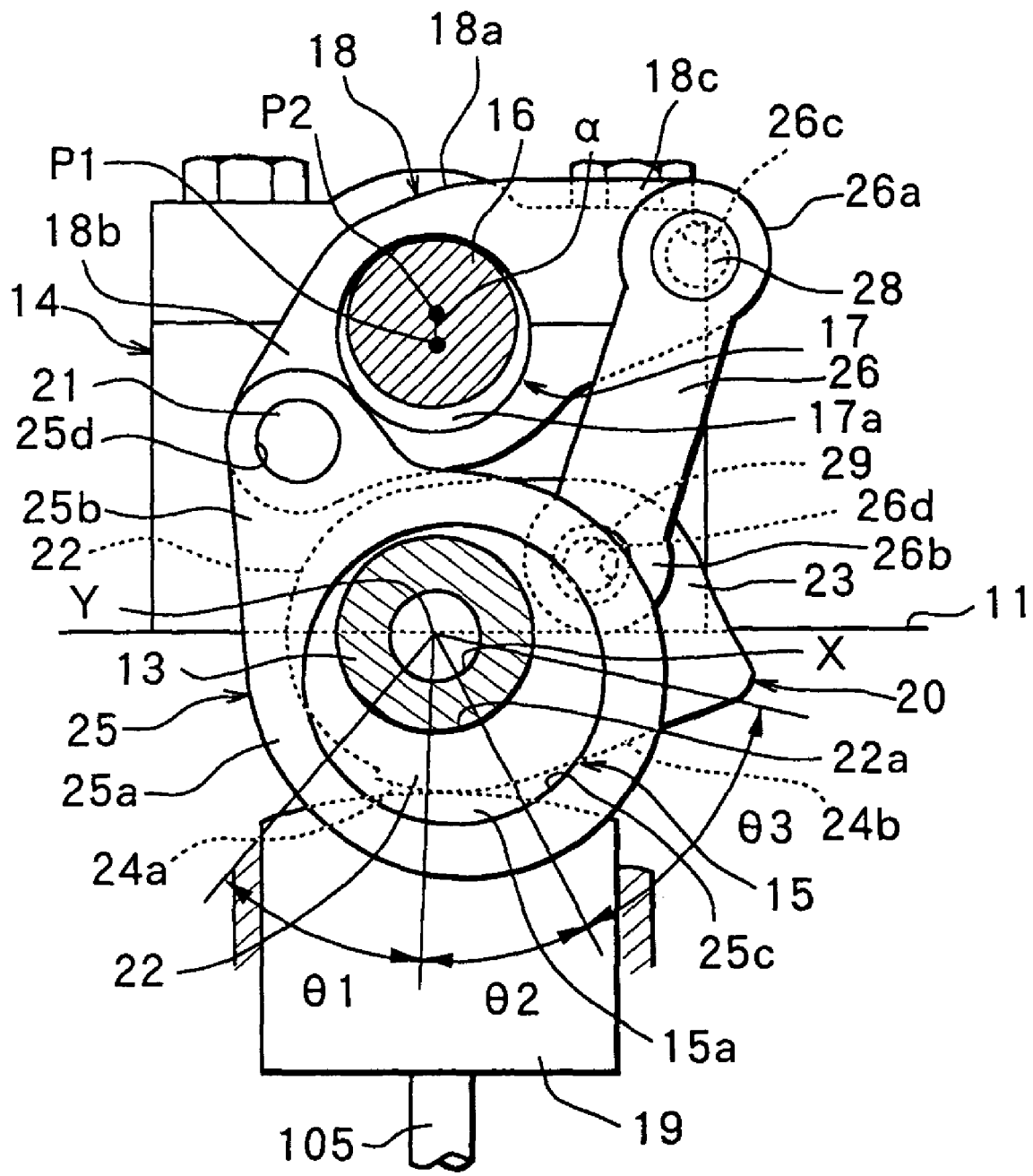
FIG. 2 is a cross section view showing a VEL serving as a variable valve mechanism in the embodiment (A—A cross section view of FIG. 3)
Figure 3:
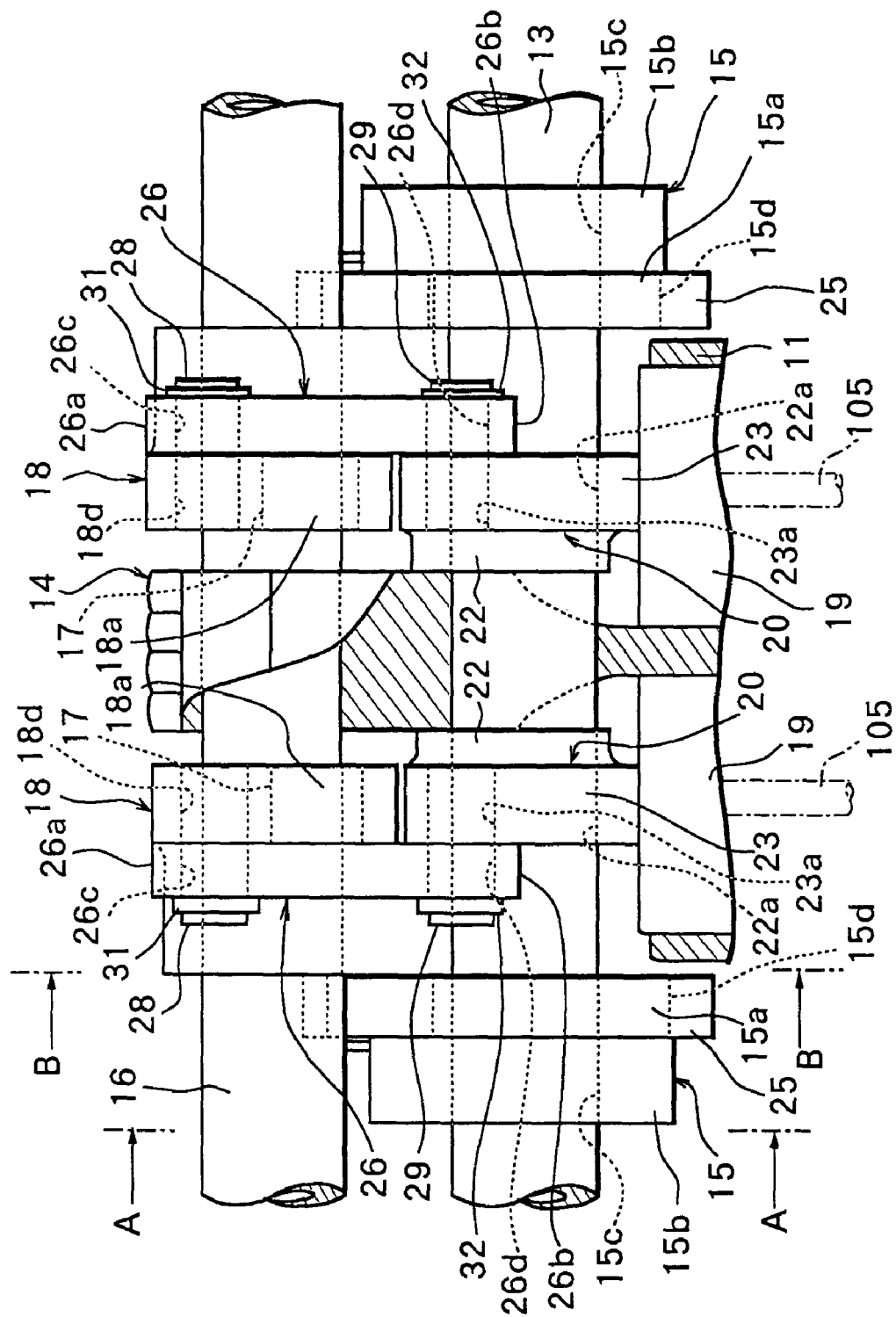
FIG. 3 is a side elevation view of the VEL.
Figure 4:
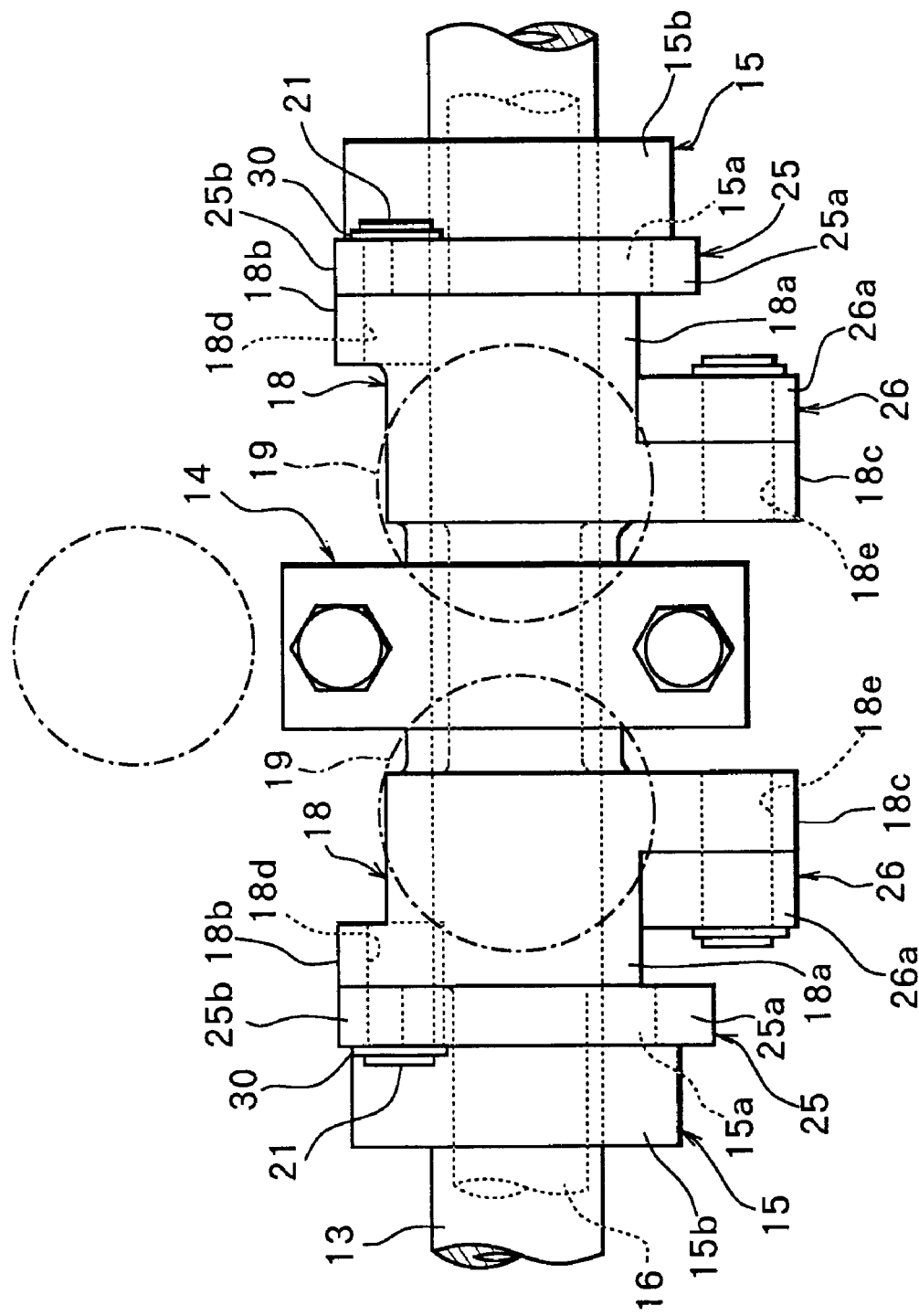
FIG. 4 is a top plan view of the VEL.

As shown in FIG. 2 to FIG. 4, VEL 112 includes a pair of intake valves 105, 105, a hollow camshaft 13 rotatably supported by a cam bearing 14 of a cylinder head 11, two eccentric cams 15, 15 being rotation cams axially supported by camshaft 13, a control shaft 16 rotatably supported by the same cam bearing 14 at an upper position of camshaft 13, a pair of rocker arms 18, 18 swingingly supported by control shaft 16 through a control cam 17, and a pair of independent swing cams 20, 20 disposed to upper end portions of intake valves 105, 105 through valve lifters 19, 19, respectively.

Eccentric cams 15, 15 are connected with rocker arms 18, 18 by link arms 25, 25, respectively. Rocker arms 18, 18 are connected with swing cams 20, 20 by link members 26, 26.

Figure 5:
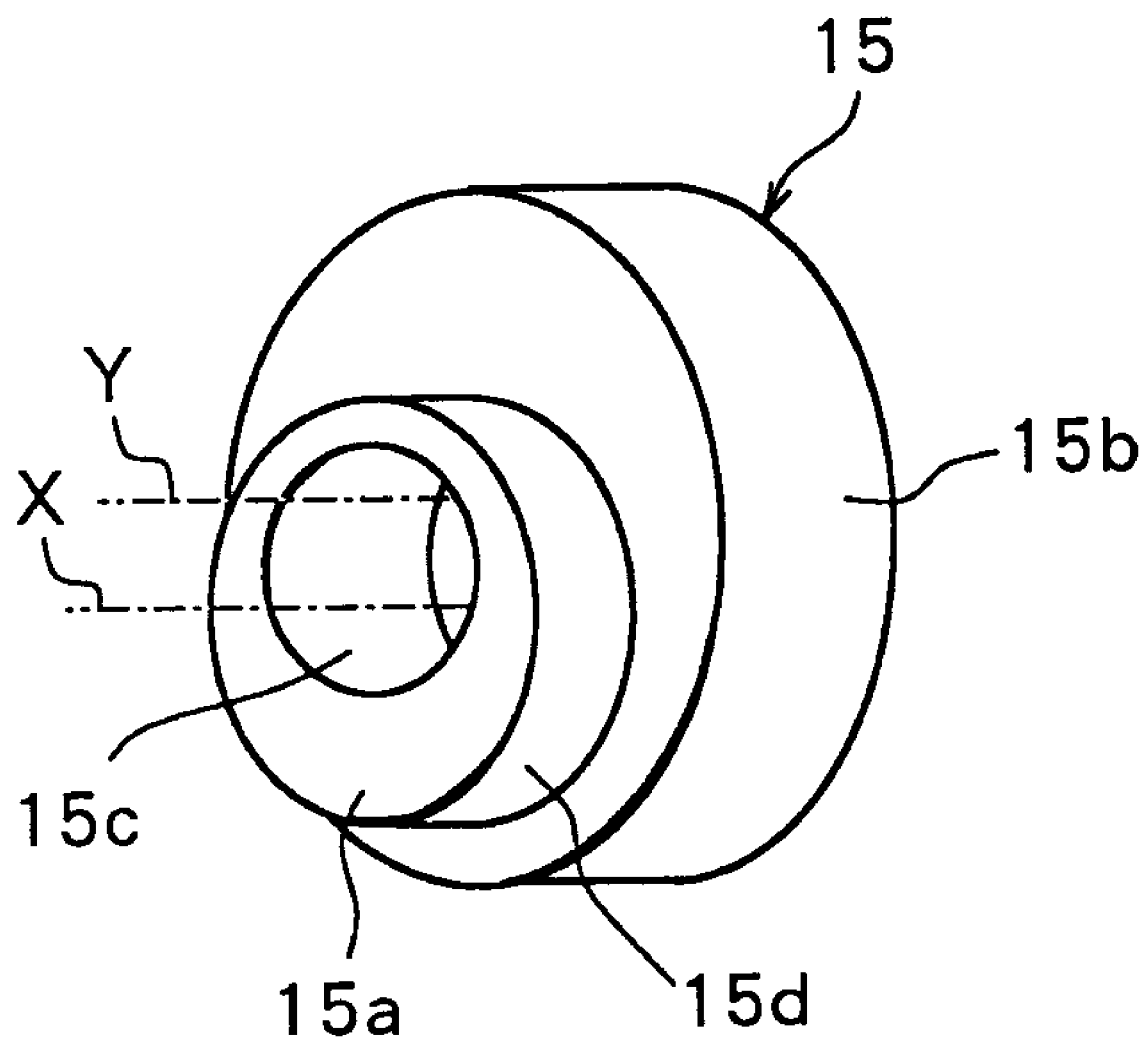
FIG. 5 is a perspective view showing an eccentric cam for use in the VEL.

Each eccentric cam 15, as shown in FIG. 5, is formed in a substantially ring shape and includes a cam body 15a of small diameter, a flange portion 15b integrally formed on an outer surface of cam body 15a. A camshaft insertion hole 15c is formed through the interior of eccentric cam in an axial direction, and also a center axis X of cam body 15a is biased from a center axis Y of camshaft 13 by a predetermined amount.

Eccentric cams 15, 15 are pressed and fixed to both outer sides of camshaft 13 via camshaft insertion holes 15c at positions not interfering with valve lifters 19, 19. Outer peripheral surfaces 15d, 15d of cam bodies 15a, 15a are formed in the same profile.

Each rocker arm 18, as shown in FIG. 4, is bent and formed in a substantially crank shape, and a central base portion 18a thereof is rotatably supported by control cam 17.

A pin hole 18d is formed through one end portion 18b which is formed to protrude from an outer end portion of base portion 18a. A pin 21 to be connected with a tip portion of link arm 25 is pressed into pin hole 18d. A pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to a periphery of control shaft 16. As shown in FIG. 2, a center axis P1 position of control cam 17 is biased from a center axis P2 position of control shaft 16 by α.

Figure 6:
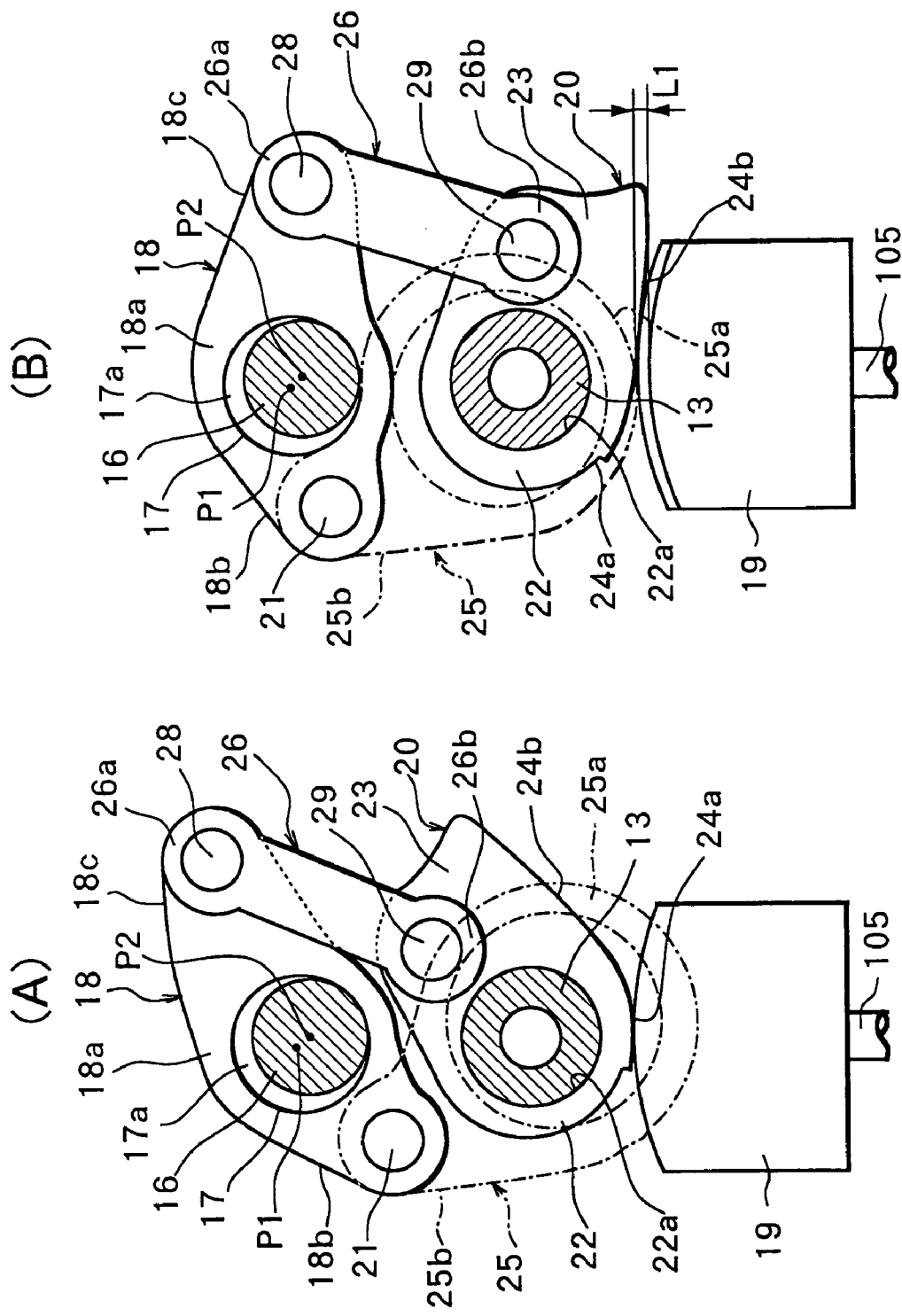
FIG. 6A and FIG. 6B are cross section views showing an operation of the VEL at a low lift condition (B—B cross section view of FIG. 3).
Figure 7:
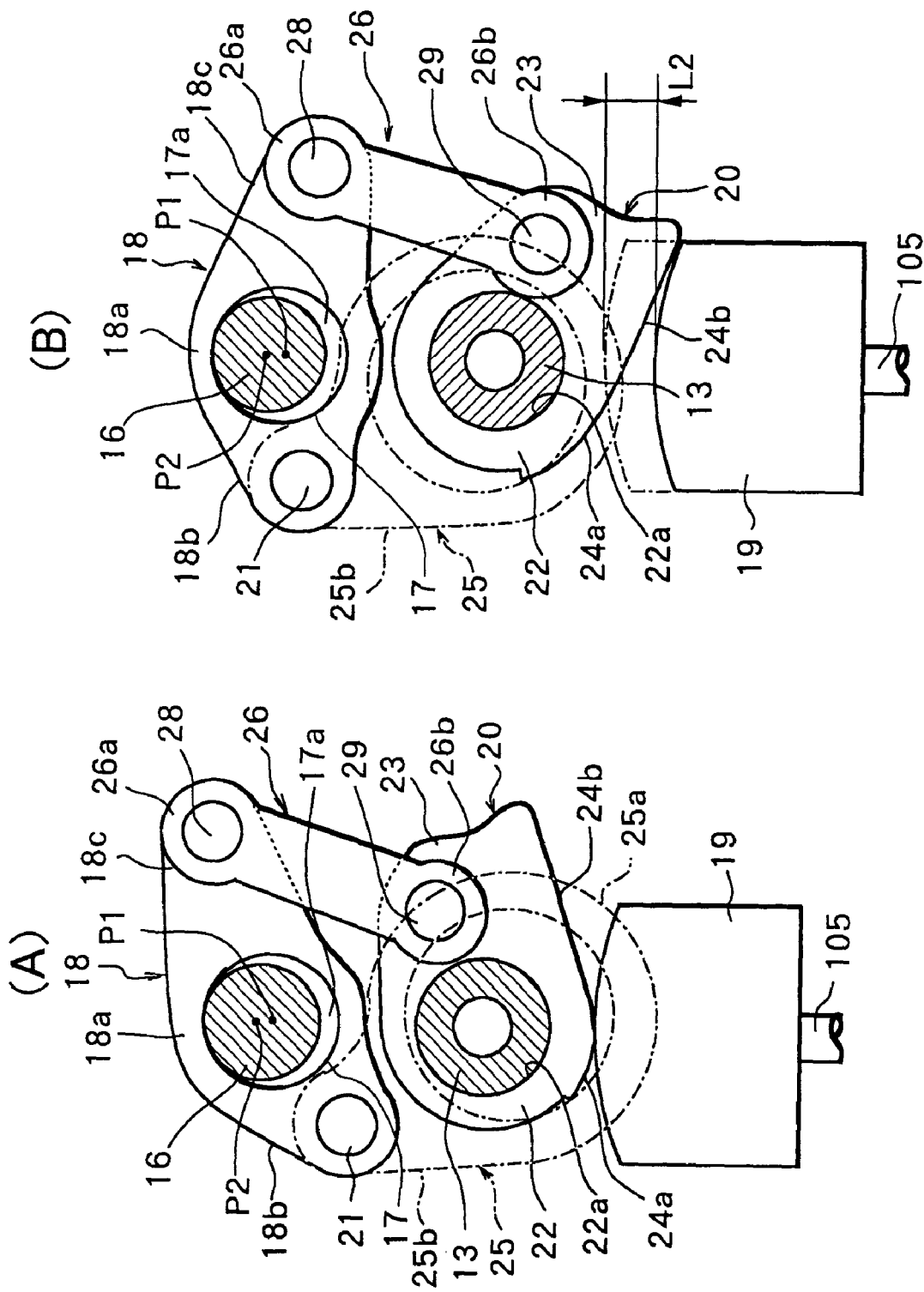
FIG. 7A and FIG. 7B are cross section views showing an operation of the VEL at a high lift condition (B—B cross section view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into base end portion 22 to be rotatably supported. Also, a pin hole 23a is formed through an end portion 23 positioned at the other end portion 18c of rocker arm 18.

A base circular surface 24a of base end portion 22 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20.

Figure 8:
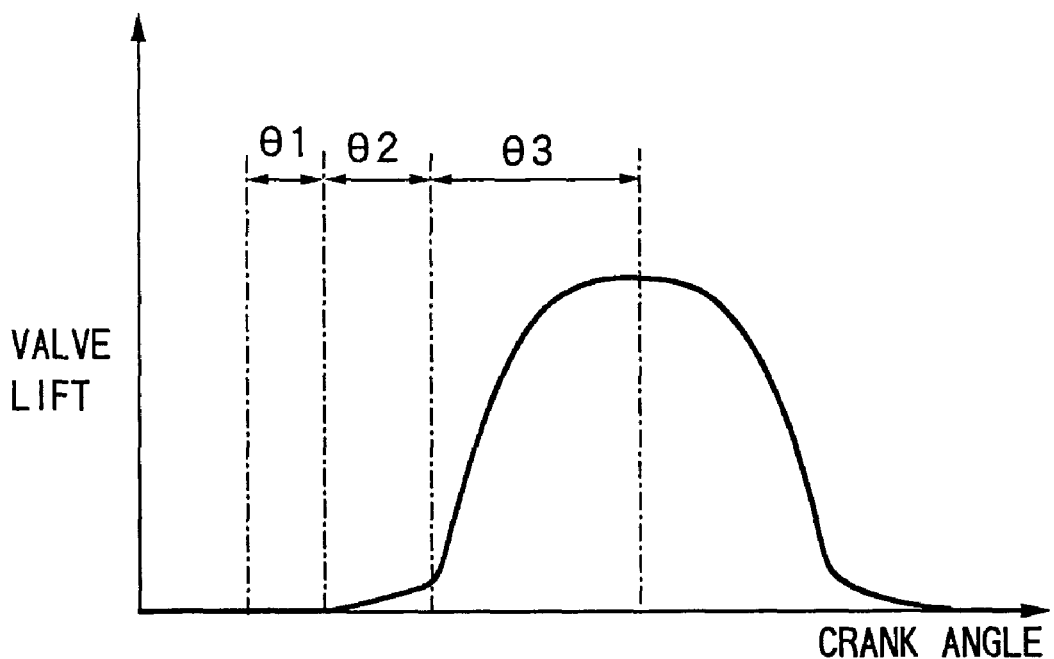
FIG. 8 is a valve lift characteristic diagram corresponding to a base end face and a cam surface of a swing cam in the VEL.

Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped base portion 25a and a protrusion end 25b protrudingly formed on a predetermined position of an outer surface of base portion 25a. A fitting hole 25c to be rotatably fitted with the outer surface of cam body 15a of eccentric cam 15 is formed on a central position of base portion 25a. Also, a pin hole 25d into which pin 21 is rotatably inserted is formed through protrusion end 25b.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d. Snap rings 30, 31, 32 restricting axial transfer of link arm 25 and link member 26 are disposed on respective end portions of pins 21, 28, 29.

In such a constitution, depending on a positional relation between the center axis P2 of control shaft 16 and the center axis P1 of control cam 17, as shown in FIG. 6 and FIG. 7, it is possible to vary the valve lift amount, and by driving control shaft 16 to rotate, the position of the center axis P2 of control shaft 16 relative to the center axis P1 of control cam 17 is changed.

Figure 9:
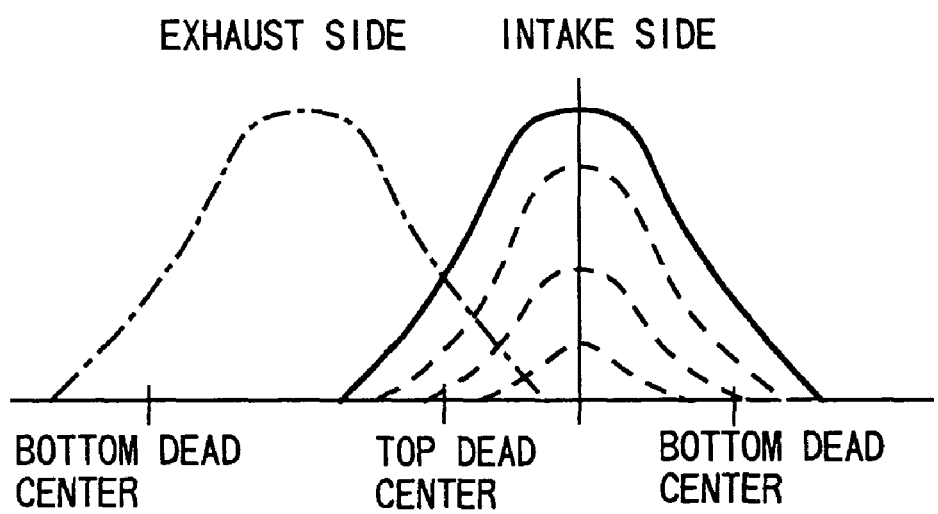
FIG. 9 is a characteristic diagram showing valve timing and valve lift of the VEL.

Control shaft 16 is driven to rotate within a predetermined angle range by a DC servo motor (actuator) 201 disposed at one end portion thereof. By varying an operating angle of control shaft 16 by DC servo motor 201, the valve lift amount and valve operating angle of each of intake valves 105, 105 are successively varied (refer to FIG. 9).

Figure 10:
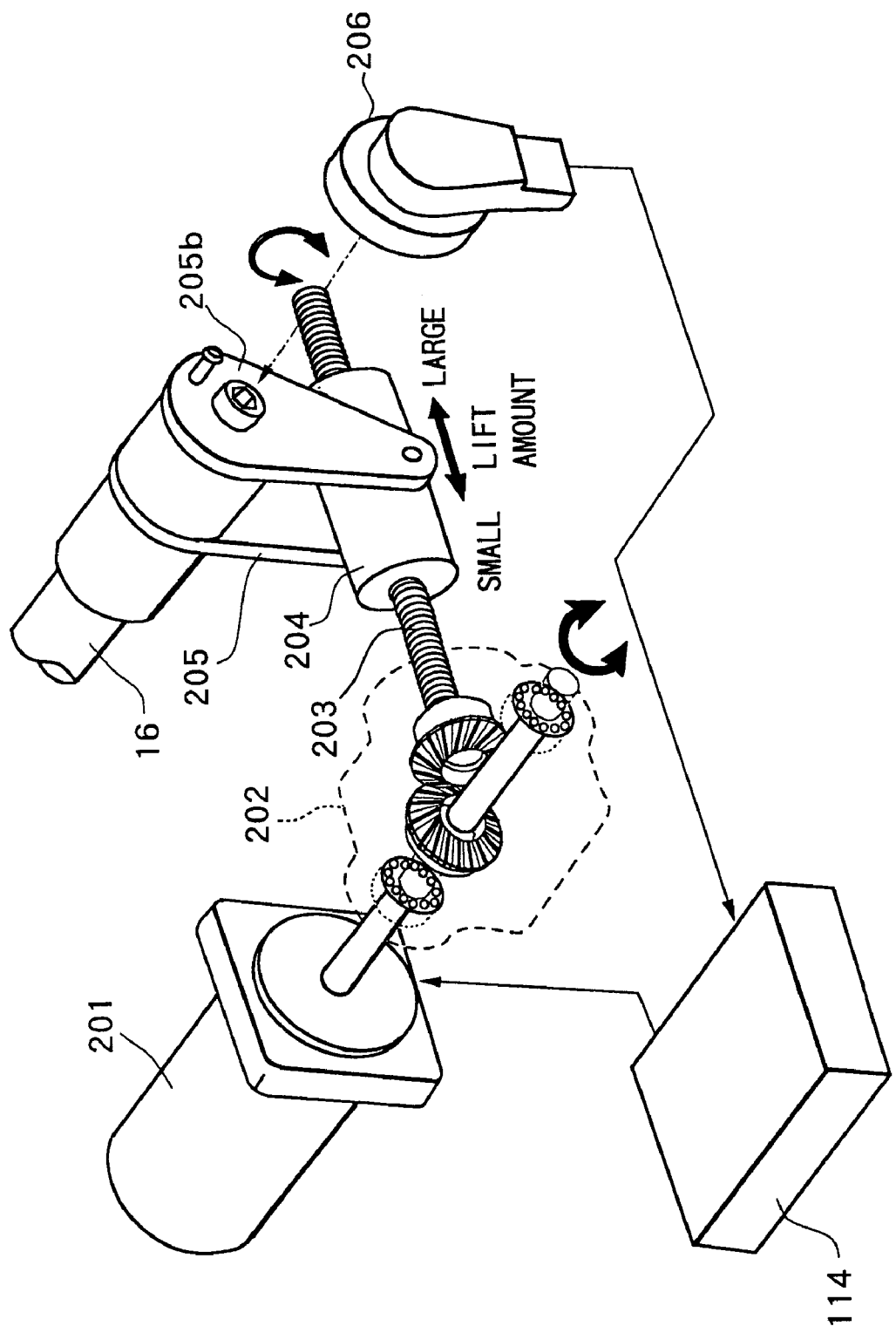
FIG. 10 is a perspective view showing a rotational driving mechanism of a control shaft in the VEL.

That is, in FIG. 10, the rotation of actuator (DC servo motor) 201 is transmitted via a transmission member 202 to a threaded shaft 203, and then, shaft 203 is rotated. When shaft 203 is rotated, an axial position of a nut 204 engaged with shaft 203 is changed. As a result, a pair of stay members 205a, 205b attached to the tip portion of control shaft 16 with one ends thereof being fixed to nut 204 are rotated so that control shaft 16 is rotated.

In the present embodiment, the valve lift amount is decreased by bringing the position of nut 204 closer to transmission member 202, while the valve lift amount is increased by getting the position of nut 124 away from transmission member 202.

Further, a potentiometer type operating angle sensor 206 detecting the operating angle VCS-ANGL of control shaft 16 (that is, VEL 112) is disposed on the tip portion of control shaft 16, as shown in FIG. 10. C/U 114 feedback controls DC servo motor (actuator) 201 so that an actual operating angle detected by operating angle sensor 206 coincides with a target operating angle TGVEL.

On the other hand, as VTC 113, there can be used a known variable valve timing mechanism constituted to change a rotation phase of a camshaft relative to a crankshaft. Therefore, although the detailed description thereof will be omitted here, there is known a variable valve timing mechanism as disclosed in Japanese Unexamined Patent Publication No. 2001-041013 in which a guide plate formed with a spiral guide with which a sliding portion of a link arm is engaged is relatively rotated by a braking force of an electromagnetic brake, to change the rotation phase of the camshaft, or a variable valve timing mechanism constituted to change a relative rotation position of a vane relative to a housing by an oil pressure, to change the rotation phase of the camshaft.

In the constitution as mentioned in the above, there will be described an intake air amount control executed by C/U 114, more specifically, a control on electronically controlled throttle 104, VEL 112 and VTC 113.

Figure 11:
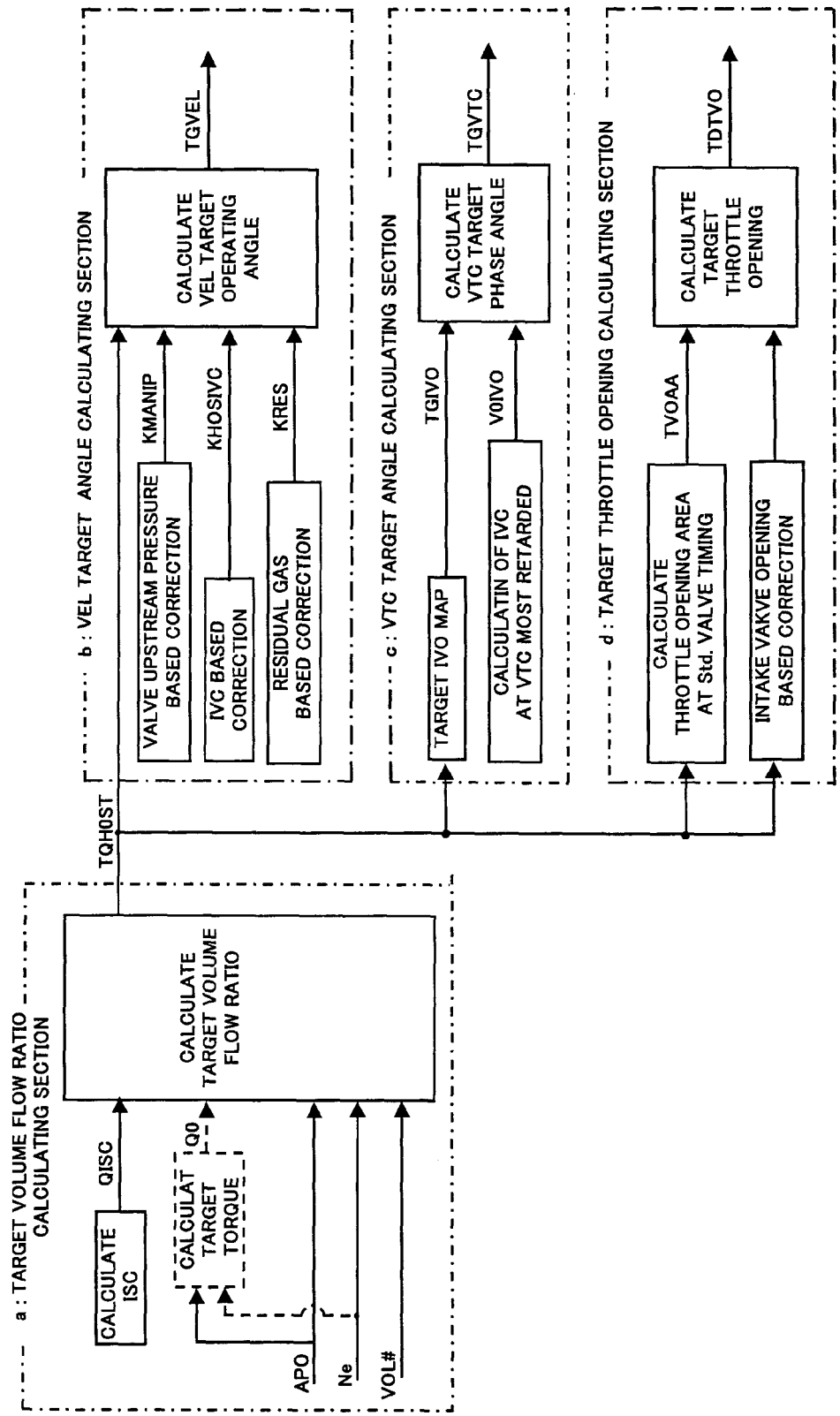
FIG. 11 is an entire block diagram showing an intake air amount control in the embodiment.

FIG. 11 shows an entire block diagram showing an intake air amount control. As shown in FIG. 11, C/U 114 includes a target volume flow ratio calculating section "a", a VEL target operating angle calculating section "b", a VTC target angle calculating section "c" and a target throttle opening calculating section "d".

(a) Calculation in Target Volume Flow Ratio Calculating Section "a"

The target volume flow ratio calculating section "a" calculates a target volume flow ratio TQH0ST equivalent to a target torque of the engine.

To be specific, a requested engine air amount Q0 corresponding to accelerator opening APO and engine rotation speed Ne is calculated, and also a requested ISC air amount QISC requested in an idle rotation speed control (ISC) is calculated.

Then, requested engine air amount Q0 is added with requested ISC air amount QISC to calculate the total requested air amount Q (=Q0+QISC). The resultant total requested air amount Q is divided sequentially by engine rotation speed Ne and a discharge amount (total cylinder volume) VOL# to calculate target volume flow ratio TQH0ST (=Q/(Ne·VOL#)) (equivalent to the target torque) in intake valve 105.

(b) Calculation in VEL Target Angle Calculating Section "b"

The VEL target operating angle calculating section "b" calculates a volume flow ratio TQH0VEL to be realized in VEL 112, by executing a valve upstream pressure based correction, an IVC based correction (correction according to closing timing of intake valve 105) and a residual gas based correction on target volume flow ratio TQH0ST calculated at the target volume flow ratio calculating part "a".

Next, the volume flow ratio TQH0VEL is converted into a target valve opening area TVELAA, to obtain a target operating angle TGVEL0.

Then, target operating angle TGVEL0 and a maximum operating angle VELHLMT of VEL 112 are compared with each other, to set a final VEL target operating angle TGVEL.

In the following, the setting of target operating angle TGVEL of VEL 12 will be described in detail.

(b-1) Calculation (Setting) of Target Operating Angle (TGVEL) of VEL 112

Figure 12:
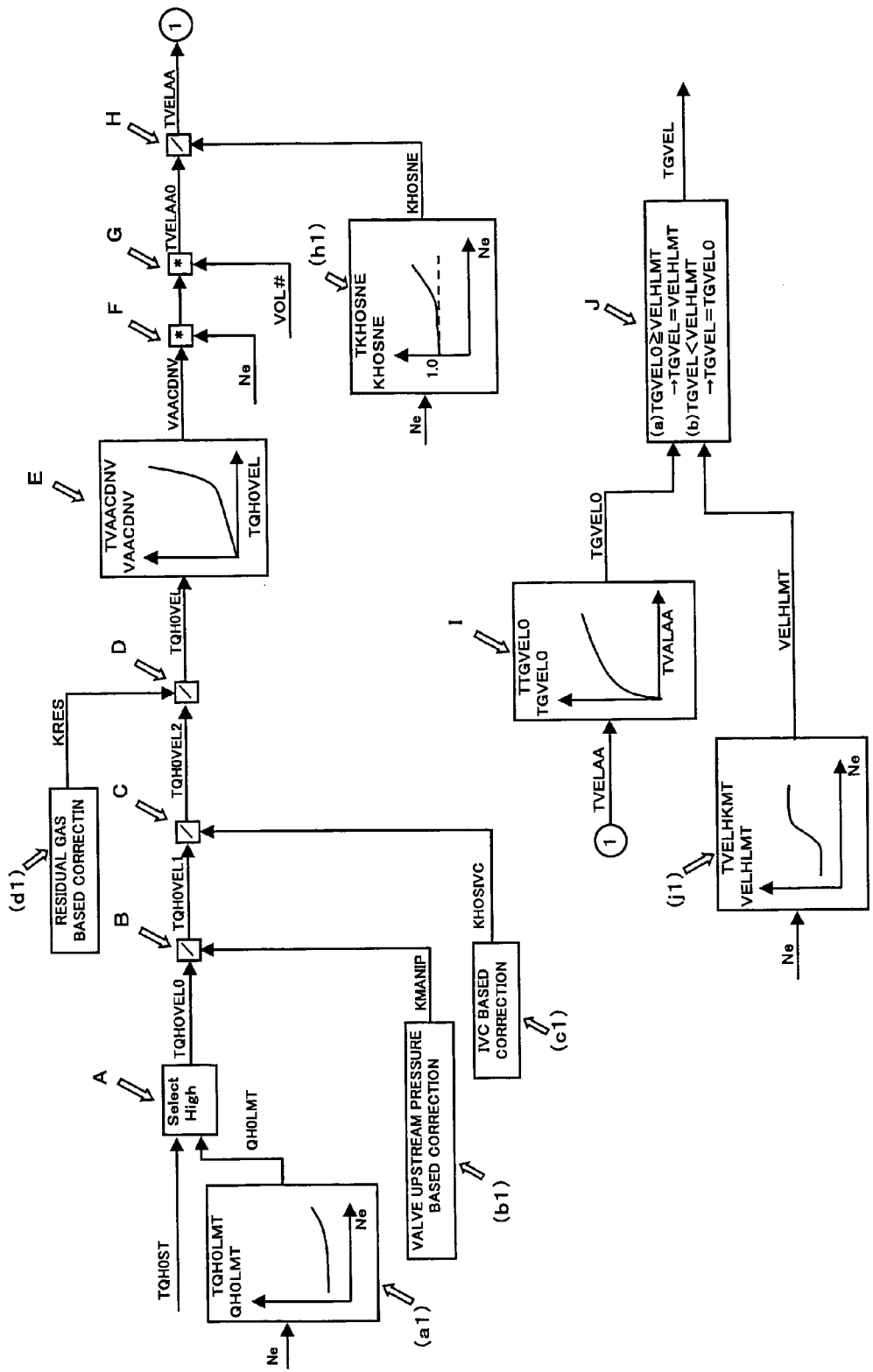
FIG. 12 is a block diagram showing the calculation of a target operating angle of the VEL.

FIG. 12 shows a specific control block diagram.

In FIG. 12, at A part, a higher one of target volume flow ratio TQH0ST and a minimum volume flow ratio QH0LMT is selected, to be set as a basic volume flow ratio TQH0VEL0 to be realized in VEL 112. Here, minimum volume flow ratio QH0LMT is the one controllable (realizable) by VEL 112, that is, the volume flow ratio of when the VEL operating angle VCS-ANGL is minimum, which is calculated by retrieving a table TQH0LMT as shown in a1 part in the figure, based on engine rotation speed Ne. Thus, by setting basic volume flow ratio TQH0VEL0 to be realized in VEL 112, an intake air amount control mainly by VEL 112 is executed.

At B part, the valve upstream pressure based correction is executed.

To be specific, basic volume flow ratio TQH0VEL0 is divided by a valve upstream pressure correction value KMANIP which is set at b1 part to obtain TQH0VEL1.

The reason why such a correction is executed is that, since the volume flow amount (intake amount) capable to be sucked is also changed due to a negative pressure generated according to the throttle opening, it is required to set the valve operating characteristic (that is, valve opening area) considering this change in order to ensure a total requested intake amount Q. Consequently, when throttle valve 103b is fully opened, this correction is unnecessary. However, actually, throttle valve 103b is throttled in response to a request of negative pressure for purging and the like, such a correction is necessary. The setting of this valve upstream pressure based correction value KMANIP will be described later (refer to FIG. 13).

At C part, the IVC based correction is executed.

To be specific, volume flow ratio TQH0VEL1 obtained after execution of the valve upstream pressure based correction, is divided by an IVC based correction value KHOSIVC ($\leq 1$) which is set at c1 part according to closing timing IVC and valve lift amount of intake valve 105, to obtain TQH0VEL2.

The reason why such a correction is executed is that, when closing timing IVC of intake valve 105 is advanced, since effective cylinder volume is decreased to change the intake amount, it is required to set the valve operating characteristic considering this decrease (=Vcyl of when intake valve is closed (IVC)/Vcyl at BDC) in order to ensure total requested intake amount Q. The setting of this IVC based correction value KHOSIVC will be described later (refer to FIG. 14).

At D part, the residual gas based correction is executed.

Volume flow ratio TQH0VEL2 obtained after executions of the valve upstream pressure based correction and the IVC based correction, is divided by a residual gas based correction value KRES which is set at d1 part according to a residual gas amount to obtain TQH0VEL.

Note, TQH0VEL calculated here is the volume flow ratio to be realized in VEL 112 (to be referred to hereunder as VEL realizing volume flow amount).

The reason why such a correction is executed is that, if the residual gas amount is increased, since the intake amount is decreased even with the same effective cylinder volume, it is required to set the valve operating characteristic considering this decrease in order to ensure total requested intake amount Q. The setting of this residual gas based correction value KRES will be described later (refer to FIG. 15).

At E part, a state amount VAACDNV (=Av·Cd/N/VOL#=valve opening area·loss coefficient/rotation speed/exhaust amount) equivalent to valve opening area Av is calculated.

To be specific, such a calculation is performed by retrieving a table TVMCDMV as shown in the figure, based on VEL realizing volume flow ratio TQH0VEL.

The above table TVMCDMV is prepared as follows, for example. At first, an air flow amount passing through intake valve 105 (that is, a cylinder intake air amount) Qc (t) (kg/sec) can be represented by equations (1), (2) based on an equation of a one-dimensional steady flow of compressed fluid.

$$\text{At choke: } \frac{Pc}{P0} \leq \left(\frac{2}{\gamma+1}\right)^{\frac{\gamma}{\gamma-1}} \quad (1)$$

$$Qc(t) = \frac{Cd \cdot Av \cdot P0}{\sqrt{R \cdot T0}} \sqrt{\gamma \left(\frac{2}{\gamma-1}\right)^{\frac{\gamma+1}{2(\gamma-1)}}}$$

At no choke:

$$Qc(t) = \frac{Cd \cdot Av \cdot P0}{\sqrt{R \cdot T0}} \left(\frac{Pc}{P0}\right)^{\frac{1}{\gamma}} \sqrt{\frac{2\gamma}{\gamma-1}\left(1-\left(\frac{Pc}{Pm}\right)^{\frac{\gamma-1}{\gamma}}\right)} \quad (2)$$

In the above equations,

R: a gas constant (=287) [J/(Kg·K)],

γ: a ratio of specific heat (=1.4), Cd: an intake valve flow loss coefficient,

Av: intake valve opening area (m²),

P0: an intake valve upstream pressure (for example, intake manifold pressure PM) (Pa), Pc: an intake valve downstream pressure (that is, cylinder pressure) (Pa): and T0: an intake valve upstream temperature (for example, an intake manifold temperature Tm) (K).

VEL realizing volume flow ratio TQH0VEL is obtained by dividing the air amount passing through intake valve 105 by engine rotation speed Ne and discharge amount VOL#. Therefore, it can be also represented by equations (3) and (4).

$$\text{At choke: } \frac{Pc}{P0} \leq \left(\frac{2}{\gamma+1}\right)^{\frac{\gamma}{\gamma-1}} \quad (3)$$

$$TQH0VEL = \frac{Cd \cdot Av \cdot P0}{Ne \cdot VOL\# \cdot \sqrt{R \cdot T0}} \sqrt{\gamma} \left(\frac{2}{\gamma-1}\right)^{\frac{\gamma+1}{2(\gamma-1)}}$$

At no choke:

$$TQH0VEL = \frac{Cd \cdot Av \cdot P0}{Ne \cdot VOL\# \cdot \sqrt{R \cdot T0}} \left(\frac{Pc}{P0}\right)^{\frac{1}{\gamma}} \sqrt{\frac{2\gamma}{\gamma-1}\left(1-\left(\frac{Pc}{P0}\right)^{\frac{\gamma-1}{\gamma}}\right)} \quad (4)$$

Consequently, since VEL realizing volume flow ratio TQH0VEL becomes, at choke time, from the equation (3), a value corresponding to Cd·Av/(Ne·VOL#) and a differential pressure ratio (Pc/P0) between fore and after the intake valve, and becomes, at no choke time, from the equation (4), a value proportional to Cd·Av/(Ne·VOL#), the table TVAACDMV is prepared by obtaining in advance a correlation between TQH0VEL and Cd·Av/(Ne·VOL#) by the simulation, experiment or the like.

Then, state amount VAADCNV calculated at E part is multiplied by engine rotation speed Ne at F part, and further multiplied by discharge amount VOL# at G part, to calculate a flow amount characteristic TVELAA0 (=Av·Cd). Calculated flow amount characteristic TVELAA0 corresponds to an opening area equivalent value requested for the intake valve (to be referred to as requested valve opening area hereafter).

At H part, a valve opening area rotating correction is executed.

Specifically, calculated requested valve opening area TVELAA0 is divided by a VEL opening area rotating correction value KHOSNE, to calculate TVELAA.

The reason why such a correction is executed is that, from the property of VEL 112, an inertial force is increased if engine rotation speed Ne becomes a constant value or above, resulting in that the valve lift amount (that is, valve opening area) is increased even with the same VEL operating angle, and therefore, valve opening area is accurately calculated considering the increase.

Note, VEL opening area rotating correction value KHOSNE is calculated by retrieving, a table TKHOSNE as shown in h1 part of the figure, based on engine rotation speed Ne.

Then, calculated TVELAA is a target valve opening area equivalent value (to be referred to as target valve opening area hereunder) of intake valve 105.

At I part, using a conversion table TTGVEL0 (valve opening area-valve operating angle conversion table) as shown in the figure, target valve opening area TVELAA is converted into a VEL operating angle TGVEL0.

That is, since VEL operating angle can be primarily obtained from valve opening area, by previously setting conversion table TTGVEL0, valve opening area can be readily converted into VEL operating angle. Note, it is assumed that table TTGVEL0 includes a valve flow loss coefficient Cd.

At J part, converted VEL operating angle TGVEL0 is compared with an upper limit value of VEL operating angle, that is, maximum VEL operating angle, VELHLMT capable of controlling the intake air amount in VEL 112, to set a VEL target operating angle TGVEL.

Specifically, as shown in the figure, if TGVEL0≧VELHLMT, VELHLMT is set as VEL target operating angle TGVEL. If TGVEL0<VELHLMT, TGVEL0 is set as VEL target operating angle TGVEL. Maximum VEL operating angle VELHLMT is calculated by retrieving a table TVELHLMT previously set as shown in j1 part of the figure based on engine rotation speed Ne.

Then, C/U 114 controls VEL 112, so that an actual VEL operating angle VCS-ANGL reaches VEL target operating angle (TGVEL). As a result, it is possible to realize utmost the intake air amount control by VEL 112 while keeping the volume efficiency at the maximum.

(b-2) Setting of Valve Upstream Pressure Based Correction Value KMANIP

There will be described the setting of valve upstream pressure based correction value KMANIP to be used at b1 part of FIG. 12.

First, it is required to establish the following equations (5) and (6) from the equation of the one-dimensional steady flow of compressed fluid, in order to keep the air amount passing through intake valve 105 constant even if the valve upstream pressure (intake manifold pressure) is changed (this change is Pm0 to Pm1) by throttling throttle valve 103b.

$$\text{At choke:} \quad (5)$$

$$\frac{Cd0 \cdot Av0 \cdot Pm0}{\sqrt{R \cdot Tm}} \cdot \sqrt{\gamma} \cdot \left(\frac{2}{\gamma-1}\right)^{\frac{\gamma+1}{2(\gamma-1)}} =$$

$$\frac{Cd1 \cdot Av1 \cdot Pm1}{\sqrt{R \cdot Tm}} \cdot \sqrt{\gamma} \cdot \left(\frac{2}{\gamma-1}\right)^{\frac{\gamma+1}{2(\gamma-1)}}$$

At no choke:

$$\frac{Cd0 \cdot Av0 \cdot Pm0}{\sqrt{R \cdot Tm}} \cdot \left(\frac{Pc0}{Pm0}\right)^{\frac{1}{\gamma}} \sqrt{\frac{2\gamma}{\gamma-1}\left(1-\left(\frac{Pc0}{Pm0}\right)^{\frac{\gamma-1}{\gamma}}\right)} = \quad (6)$$

$$\frac{Cd1 \cdot Av1 \cdot Pm1}{\sqrt{R \cdot Tm}} \cdot \left(\frac{Pc1}{Pm1}\right)^{\frac{1}{\gamma}} \sqrt{\frac{2\gamma}{\gamma-1}\left(1-\frac{Pc1}{Pm1}^{\frac{\gamma-1}{\gamma}}\right)}$$

In the above equations,

Pm0: valve upstream pressure at the time when throttle valve is fully opened (intake manifold pressure substantially equals atmospheric pressure), Pm1: valve upstream pressure at the time of target Boost (intake manifold pressure), Pc0: valve downstream pressure at the time when throttle valve is fully opened (substantially equals cylinder pressure), Pc1: valve downstream pressure at the time of target Boost (substantially equals cylinder pressure),
Av0: intake valve opening area at the time when throttle valve is fully opened, and
Av1: intake valve opening area at the time of target Boost.

Accordingly, valve upstream pressure based correction value KMANIP relative to valve opening area Av0 at the time when the valve upstream pressure equals the atmospheric pressure (Pm0) may be represented by the following equations (7) and (8).

At choke time: (7)
$$KMANIP = \frac{Cd0 \cdot Av0}{Cd1 \cdot Av1} = \frac{Pm1}{Pm0}$$

At no choke: (8)
$$KMANIP = \frac{Cd0 \cdot Av0}{Cd1 \cdot Av1} = \frac{Pm1 \cdot \left(\frac{Pc1}{Pm1}\right)^{\frac{1}{\gamma}} \cdot \sqrt{\left(1 - \left(\frac{Pc1}{Pm1}\right)^{\frac{\gamma-1}{\gamma}}\right)}}{Pm0 \cdot \left(\frac{Pc0}{Pm0}\right)^{\frac{1}{\gamma}} \cdot \sqrt{\left(1 - \left(\frac{Pc0}{Pm0}\right)^{\frac{\gamma-1}{\gamma}}\right)}}$$

Namely, valve upstream pressure based correction value KMANIP is primarily determined by "target Boost (manifold pressure)/the atmospheric pressure" at choke time. Further, even at no choke time, since it is considered that (Pc0/Pm0) substantially equals (Pc1/Pm1), "target Boost/the atmospheric pressure" becomes dominative.

In either of the cases, valve upstream pressure based correction value KMANIP can be made "target Boost/the atmospheric pressure".

Figure 13:
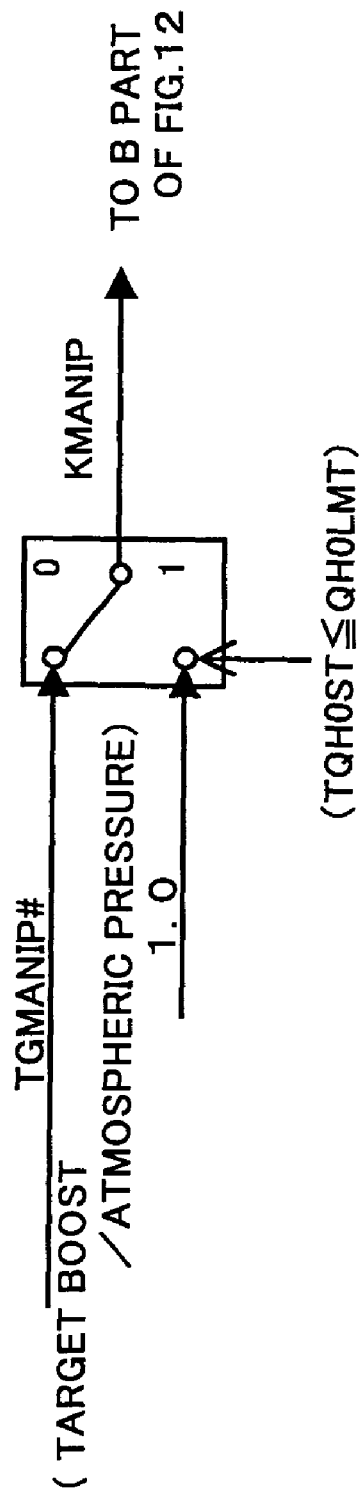
FIG. 13 is a block diagram showing the setting of a valve upstream pressure based correction value KMANIP.

Therefore, in this embodiment, as shown in FIG. 13, "target Boost (target manifold pressure)/the atmospheric pressure" is set by a constant (for example, 88 Kpa/101.3 Kpa) as valve upstream pressure based correction value KMANIP, to be output to B part in FIG. 12. However, in the case where target volume flow TQH0ST is equal to or less than minimum volume flow ratio QH0LMT, that is in the case where minimum volume flow ratio QH0LMT is selected at A part in FIG. 12, regardless of the valve upstream pressure, 1.0 is output to B part in FIG. 12 as valve upstream pressure based correction value KMANIP so that the valve operating angle equivalent to minimum volume flow ratio QH0LMT can be finally obtained.

(b-3) Setting of IVC Based Correction Value KHOSIVC

There will be described the setting of IVC based correction value KHOSIVC executed at c1 part in FIG. 12.

The setting of IVC based correction value KHOSIVC in the present embodiment is executed such that, first a valve timing correction value HIVC ($\leqq$) is calculated based on closing timing IVC of intake valve 105, and also a valve lift amount correction value HLIFT ($\geqq 1$) is calculated based on the valve lift amount of intake valve 105, and valve timing correction value HIVC is multiplied by valve lift amount correction value HLIFT, to set IVC based correction value KHOSIVC. Such setting will be described in accordance with a control block diagram in FIG. 14.

Figure 14:
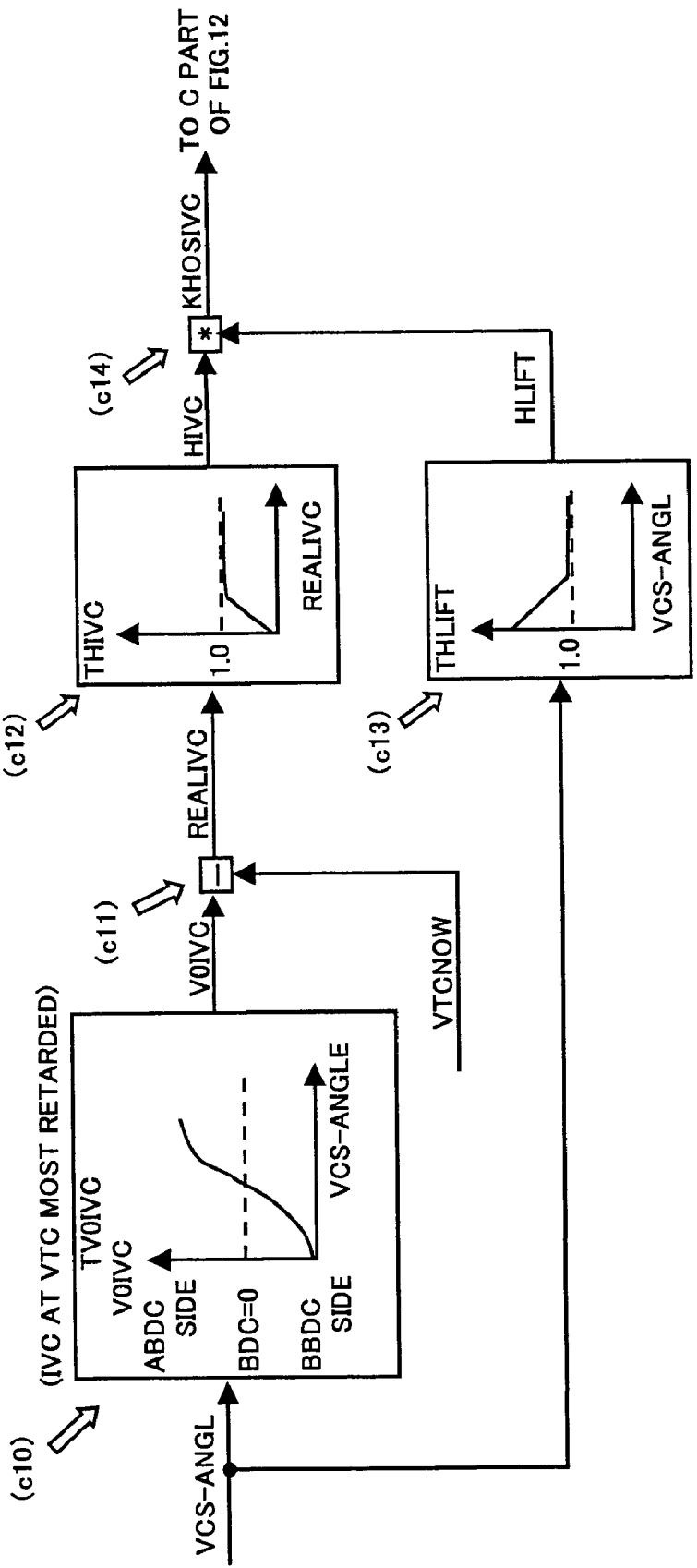
FIG. 14 is a block diagram showing the setting of an IVC based correction value KHOSIVC.

In FIG. 14, at c10 part, a table TV0IVC previously set is retrieved based on operating angle VCS-ANGL of VEL 112, to calculate closing timing V0IVC (IVC angle) of intake valve 105 at the time when VTC 113 does not operate (that is, at VTC most retarded).

At c12 part, a rotation phase VTCNOW of an intake side camshaft (that is, the operating angle of VTC 113) is subtracted from calculated V0IVC, to calculate actual closing timing REALIVC (actual IVC angle) of intake valve 105.

At c12 part, based on calculated actual closing timing REALIVC, a table THIVC as shown in the figure is retrieved, to calculate valve timing correction value HIVC ($\leqq 1$) corresponding to closing timing of intake valve 105. Note, as indicated in table THIVC, valve timing correction value HIVC is set to be smaller as closing timing IVC is further advanced, so that basic volume flow ratio TQH0VEL0 is increasingly corrected.

On the other hand, at c13 part, based on operating angle VCS-ANGL of VEL 112, a table THLFT as shown in the figure is retrieved, to calculate valve lift amount correction value HLIFT ($\geqq 1$) corresponding to the valve lift amount of intake valve 105. Note, as indicated in table THLIFT, valve lift amount correction amount HLIFT is set to be larger as the valve lift amount is lower in a region where the valve lift amount is less than a predetermined amount (for example, a value obtained in advance by experiment or the like as a valve lift amount which cannot ensure the linearity of "valve lift amount-intake amount characteristic"), so that basic volume flow ratio TQH0VEL0 is decreasingly corrected.

Then, at c14 part, valve timing correction value HIVC is multiplied by valve lift amount correction value HLIFT, and the multiplication result is set as IVC based correction value KHOSIVC to be output to C part of FIG. 12.

Above described valve timing correction value HIVC may includes a correction accompanying valve overlap (for example, a correction according to opening timing IVO of intake valve 105), in addition to the above correction (the correction of decrease of cylinder volume).

Further, in the present invention, valve timing correction value HIVC and valve lift amount correction value HLIFT are calculated independently based on different tables in order to avoid complexity of table preparation. However, these values may be calculated based on one table prepared by combining the different tables.

(b-4) Setting of Residual Gas Based Correction Value KRES

There will be described the setting of residual gas based correction value KRES executed at d1 part of FIG. 12.

In the setting of residual gas based correction value KRES in the present embodiment, first a spit-back gas amount Wm due to valve overlap is calculated based on a valve opening area AWm during a valve overlap time. On the other hand, a residual gas amount Wcyl in a state of no valve overlap is calculated based on an actual engine intake air amount.

Next, spit-back gas amount Wm and residual gas amount Wcyl are added together, to obtain a total residual gas amount W (corresponding to a residual gas amount of the engine), which is calculated as a residual gas rate RES (=W/(Qa+W)) as a proportion of total residual gas amount W to a total cylinder gas amount.

Then, a table previously set is retrieved based on calculated residual gas rate RES, to calculate a residual gas based correction value. Such setting will be described in accordance with a control block diagram in FIG. 15.

Figure 15:
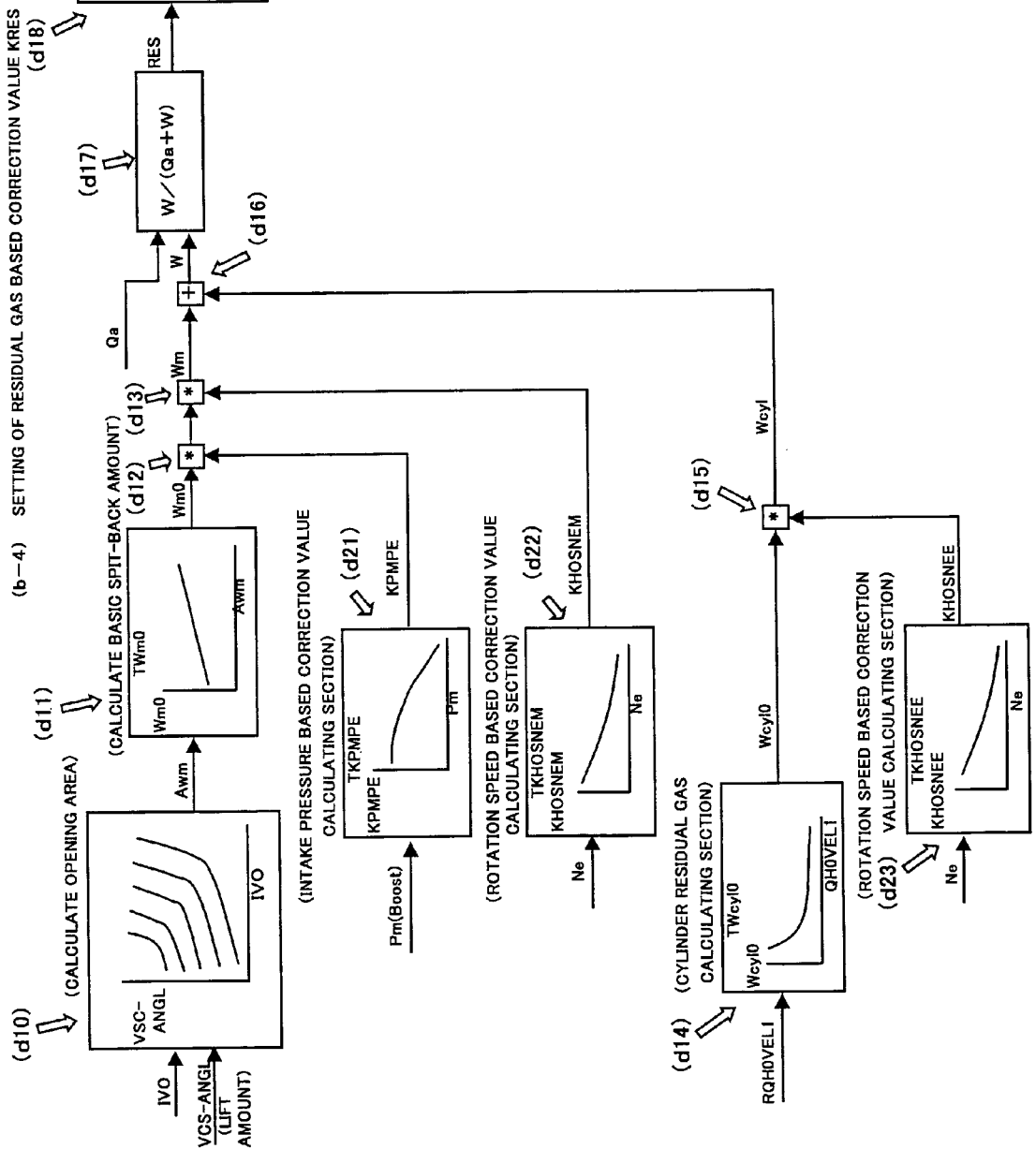
FIG. 15 is a diagram showing the setting of a residual gas based correction value KRES (calculation of a residual gas amount W).

In FIG. 15, at d10 part, a map previously set is referred to, based on opening timing IVO of intake valve 105 and operating angle VCS-ANGL (valve lift amount) of VEL 112, to calculate valve opening area AWm during the valve overlap time.

Namely, in the present embodiment, since the operating characteristic of exhaust valve 107 is constant, valve opening area AWm during the valve overlap time can be preliminarily obtained based on the valve lift amount and opening timing IVO of intake valve 105.

Here, valve opening area AWm is obtained as the total valve opening area of intake valve 105 and exhaust valve 107 during the valve overlap time. However, for more simplicity, instead of this total valve opening area, only the valve opening area of intake valve 105 having a large influence on the spit-back may be calculated.

At d11 part, a table TWm previously set is retrieved based on calculated valve opening area AWm, to calculate a basic spit-back gas amount Wm0 during the valve overlap time. This basic spit-back gas amount WM0 is obtained in advance as a spit-back gas amount according to a valve opening area in a predetermined reference condition (for example, Ne=1200 rpm, Pm=13.3 KPa).

At d12 part, an intake pressure based correction is executed on basic spit-back gas amount Wm0.

To be specific, basic spit-back gas amount Wm0 is multiplied by an intake pressure based correction value KPMPE according to intake valve upstream pressure (manifold pressure: Boost) Pm, to calculate Wm1. The reason why such a correction is executed is that an influence on the spit-back differs depending on manifold pressure Pm. Note, intake pressure based correction value KPMPE is calculated by retrieving a table TKPMPE previously set, based on manifold pressure Pm, as shown in d21 part in the figure.

At d13 part, a rotation speed based correction is executed on basic spit-back gas amount Wm1.

Figure 16:
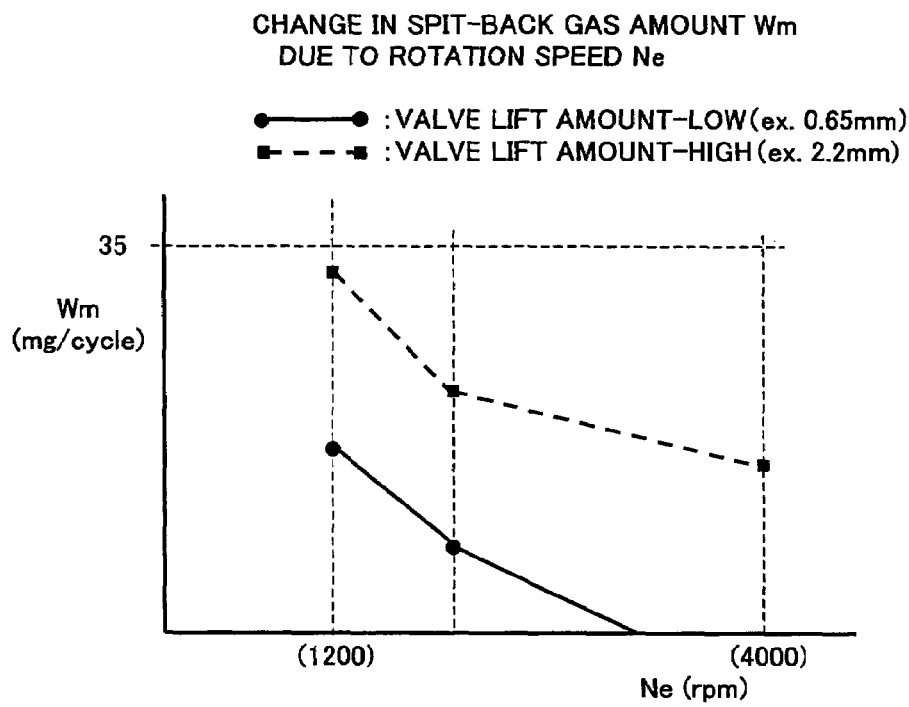
FIG. 16 is a diagram showing a relation between an engine rotation speed Ne and a spit-back gas amount Wm.

To be specific, basic spit-back gas amount Wm1 subjected to the intake pressure based correction is multiplied by a rotation speed based correction value KHOSNEM calculated based on engine rotation speed Ne at d22 part in the figure, to be set as spit-back gas amount Wm. The reason why such a correction is executed is that the influence on the spit-back differs depending on engine rotation speed Ne, even with the same valve lift amount in the reference condition. Note, since it has been verified by the experiment that the spit-back gas amount is decreased as engine rotation speed Ne is higher, rotation speed based correction value KHOSNEM is set based on this experimental result in this embodiment (refer to FIG. 16).

On the other hand, at d14 part, a table Twcyl0 previously set is retrieved based on a volume flow ratio RQH0VEL1 of working medium in intake valve 105 (corresponding to the actual engine intake air amount, to be referred to hereunder, as a basic actual engine volume flow ratio), to calculate cylinder residual gas amount Wcyl0 in the reference condition. Note, the calculation of basic actual engine volume flow ratio RQH0VEL1 will be described later (refer to q38 part of FIG. 22).

At d15 part, the rotation speed based correction is executed on cylinder residual gas amount Wcyl0 in the reference condition.

Figure 17:
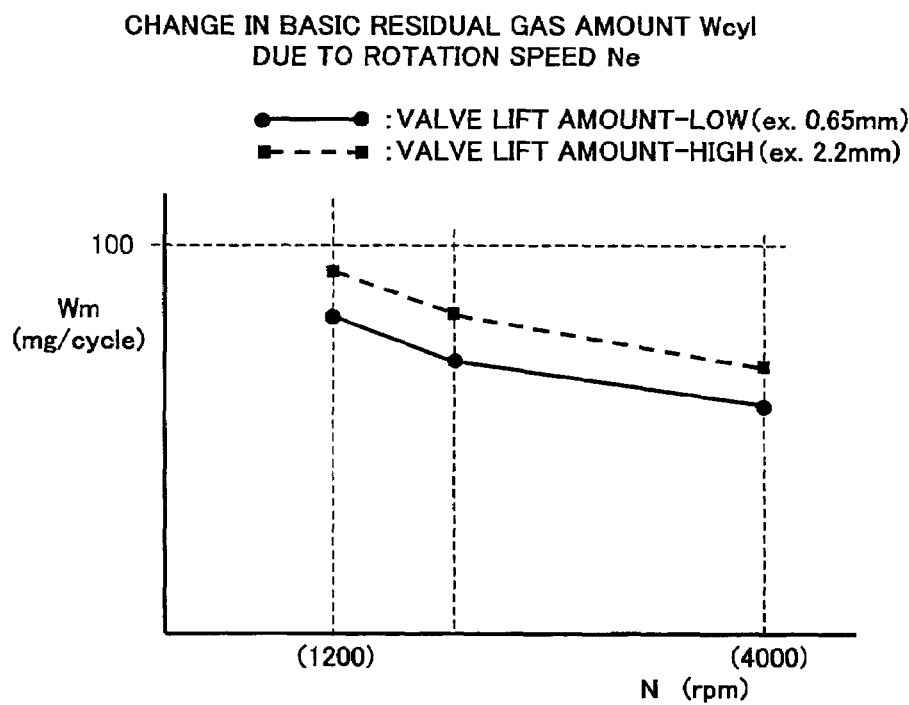
FIG. 17 is a diagram showing a relation between the engine rotation speed Ne and a basic residual gas amount Wcyl.

To be specific, cylinder residual gas amount Wcyl0 is multiplied by a rotation speed based correction value KHOSNEE calculated based on engine rotation speed Ne at d23 part, to be set as a basic residual gas amount Wcyl. The reason why such a correction is executed is that, as well as the spit-back during the overlap time, the residual gas is influenced by engine rotation speed Ne. Note, since it has been verified by the experiment that the residual gas amount is decreased as engine rotation speed Ne is higher, rotation speed based correction value KHOSNEE is set based on this experimental result, in this embodiment (refer to FIG. 17).

At d16 part, spit-back gas amount Wm and basic residual gas amount Wcyl are added together, to calculate total residual gas amount W.

Then, at d17 part, based on total residual gas amount W and intake air amount (new air amount) Qa, residual gas rate RES (=W/(W+Qa)) is calculated.

At d18 part, a table TKRES previously set is retrieved based on calculated residual gas rate RES, and residual gas based correction value KRES ($\leq 1$) is set to be output to D part of FIG. 12. As shown in table TKRES, residual gas based correction value KRES is set to be smaller as residual gas rate RES is greater. Therefore, basic volume flow ratio TQHVEL0 (TQH0VEL1) is increasingly corrected.

As described in the above, in the present embodiment, spit-back gas amount Wm during the valve overlap time is calculated, based on the total valve opening area of intake valve 105 and exhaust valve 107 (or based on the valve opening area of intake valve 105 only). Thus, considering the (total) valve opening area during the valve overlap time, the spit-back gas amount during the valve overlap time can be obtained with high accuracy, in the internal combustion engine provided with VEL 112 which variably controls the valve lift amount.

Further, based on actual engine intake air amount, basic residua gas amount Wcyl (that is, cylinder residual gas amount at the time when there is no valve overlap) is calculated. Here, basic actual engine volume flow amount RQH0VEL1 is calculated based on the operating characteristic of intake valve 105 (more specifically, the valve opening area calculated based on the operating characteristic), as described later. Therefore, it is possible to obtain directly actual engine intake air amount while avoiding response delay occurring when detection values of air flow meter 115 and the like are used, thereby enabling to obtain basic residual gas Wcyl with high accuracy.

Then, the above amounts are added together to obtain residual gas amount W of the engine (total residual gas amount), thereby enabling to estimate the residual gas amount of the engine.

In this embodiment, total residual gas amount W of the engine is estimated (calculated) for setting residual gas based correction value KRES. However, the constitution may be such that this total residual gas amount W is estimated independently, to be able to be used in other controls.

Further, other methods relating to the setting of residual gas based correction value KRES (the estimation of total residual gas amount W) will be described later (refer to FIG. 23 to FIG. 25).

(c) Calculation in VTC Target Phase Angle Calculating Section "c"

In a VTC target phase angle calculating section "c", since an Nox decrease amount is determined based on valve overlap amount, there is previously prepared a map allotted with a target valve overlap amount based on a requested NOx decrease amount for each operating region, and target valve overlap amount is calculated referring to this map, thereby setting a VTC target phase angle TGVTC while considering VEL target operating angle (TGVEL).

Such calculation will be described in detail referring to FIG. 18. In the present embodiment, since VTC 113 is provided only on the intake side, by calculating target IVO of intake valve 105 based on the map described above, target valve overlap amount can also be calculated.

Figure 18:
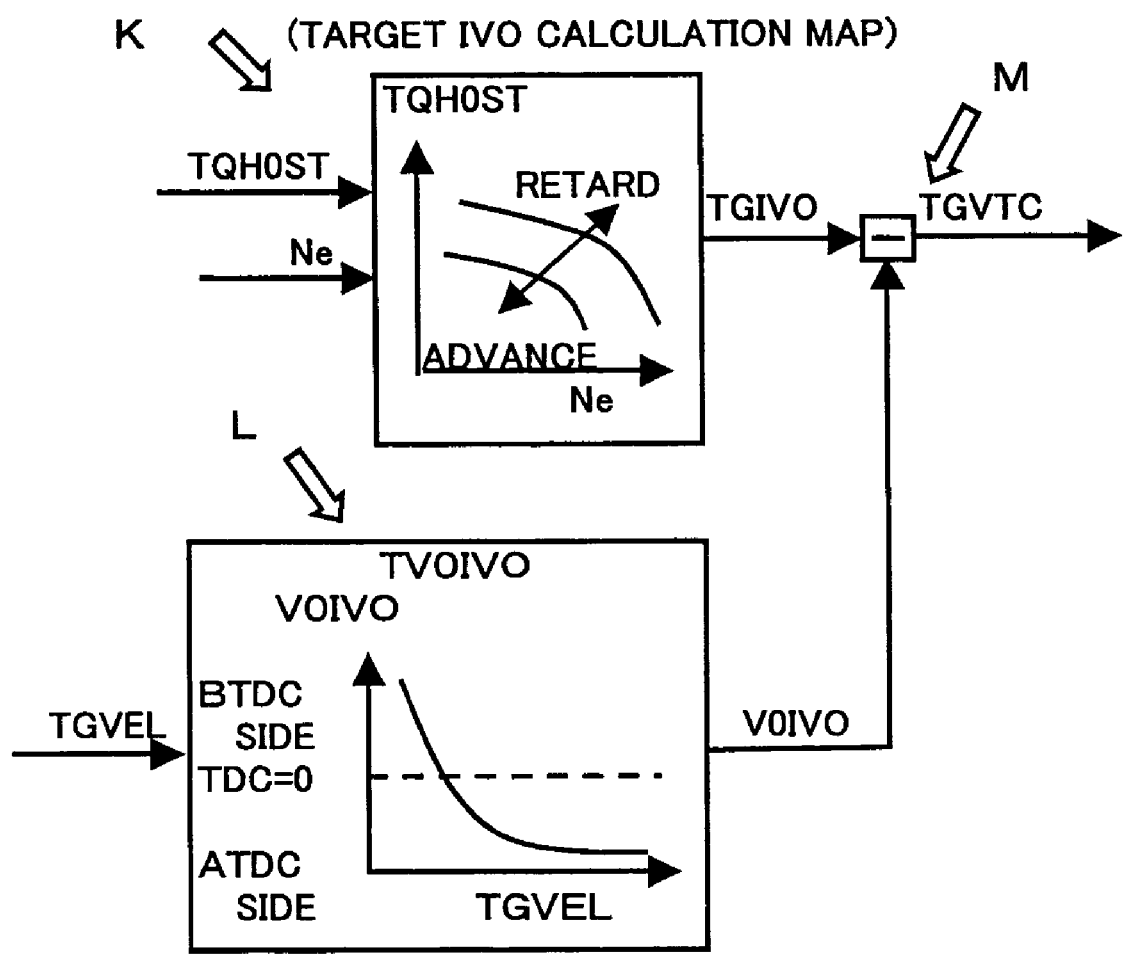
FIG. 18 is a block diagram showing the calculation of a target operating angle of a VTC serving as a variable valve mechanism.

In FIG. 18, at K part, target opening timing TGIVO of intake valve 105 is calculated referring to an IVO map previously set, based on target volume flow ratio TG0HST and engine rotation speed Ne.

At L part, a table TV0IVO previously set is retrieved based on VEL target operating angle TGVEL, to calculate opening timing V0IVO of intake valve 105 at the VTC most retarded time in the case where VEL 112 is controlled at VEL target operating angle (TGVEL).

At M part, opening timing V0IVO at the VTC most retarded time is subtracted from target opening timing TGIVO, to calculate VTC target phase angle TGVTC of VTC 113 considering the case where VEL 112 is controlled at VEL target operating angle TGVEL.

Then, C/U 114 controls VTC 113 so that actual VTC phase angle VTCNOW reaches VTC target phase angle TGVTC. Thus, it is possible to perform both of the intake air amount control and the decreasing of NOx.

(d) Calculation in Target Throttle Opening Calculating Section "d"

In a target throttle opening calculating section "d", an opening area TVOAA0 of throttle valve 103b, which is requested when intake valve 105 has a standard valve operating characteristic (in this embodiment, the valve operating characteristic of when VEL 112 does not operate), (to be referred to as requested throttle opening area hereafter) is calculated, and corrected in accordance with an actual change in valve operating characteristic of intake valve 105, to calculate a target throttle opening area TVOAA.

Then, target throttle opening TDTVO is set based on calculated target throttle opening area TVOAA.

Figure 19:
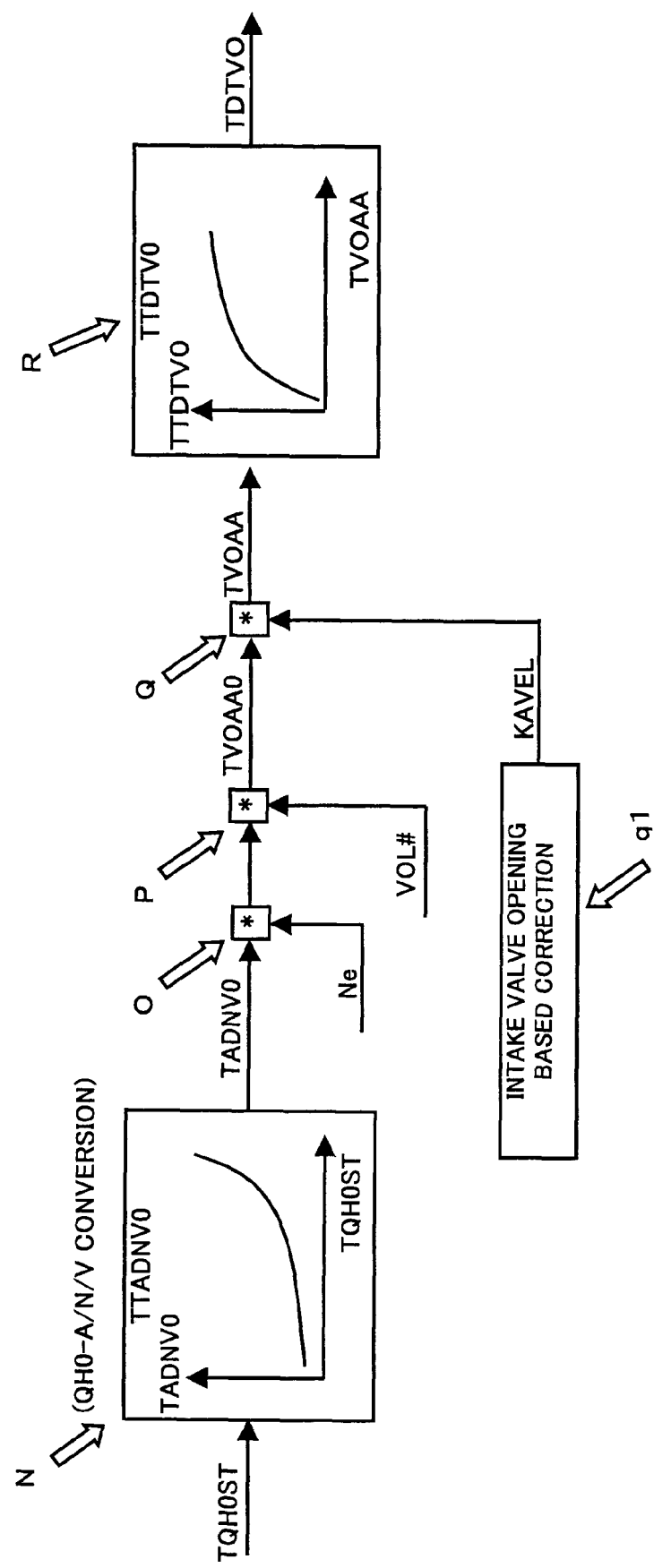
FIG. 19 is a block diagram showing the setting of a target throttle opening.

(d-1) Setting of Target Throttle Opening TDTVO FIG. 19 is a control block diagram.

In FIG. 19, at N part, a state amount TADNV0 equivalent to an opening area At of throttle valve requested at the standard valve operating characteristic is calculated.

Specifically, TADNV0 is calculated by retrieving a conversion table TTADNV0 previously set, based on target volume flow ratio TQH0ST. This state amount TADNV0 is represented by TADNV0=At/(Ne·VOL#) when the throttle opening area is At, the engine rotation speed is Ne, and the discharge amount (cylinder volume) is VOL#.

Then, calculated TADNV0 is multiplied by engine rotation speed Ne at O part, and further multiplied by discharge amount VOL# at P part, to calculate requested throttle opening area TVOM0 at standard valve operating characteristic.

At Q part, a correction according to a change in operating characteristic of intake valve 105 is executed on calculated requested throttle opening area TVOAA0.

Specifically, requested throttle opening area TVOAA0 is multiplied by an intake valve opening based correction value KAVEL calculated at q1 part, to calculate target throttle opening area TVOAA. The setting of intake valve opening based correction value KAVEL will be described later (refer to FIG. 20).

At R part, target throttle opening TDTVO is calculated by retrieving a conversion table TTVOAA previously set, based on calculated target throttle opening area TVOAA.

Then, C/U 114 controls electronically controlled throttle 104 so that actual opening of throttle valve 103b converges at target throttle opening TDTVO. Thus, it is possible to perform accurately the control in which VEL 112 and throttle valve 103b are cooperative with each other.

(d-2) Calculation of Intake Valve Opening Based Correction Value KAVEL

The setting of intake valve opening based correction value KAVEL calculated at q1 part of FIG. 19 will be described.

At first, air flow amount Qth (t) (kg/sec) passing through throttle valve 103b can be represented by the following equations (9) and (10) from the equation of the one-dimensional steady flow of compressed fluid.

$$\text{At choke time: } \frac{Pc}{Pm} \leq \left(\frac{2\gamma}{\gamma-1}\right)^{\frac{\gamma-1}{\gamma}} \tag{9}$$

$$Qth(t) = \frac{At \cdot Pa}{\sqrt{R \cdot Ta}} \sqrt{\gamma} \left(\frac{2\gamma}{\gamma-1}\right)^{\frac{\gamma+1}{2(\gamma-1)}}$$

$$\text{At no choke:} \tag{10}$$

$$Qth(t) = \frac{At \cdot Pa}{\sqrt{R \cdot Ta}} \left(\frac{Pm}{Pa}\right)^{\frac{1}{\gamma}} \sqrt{\frac{2\gamma}{\gamma-1}\left(1-\left(\frac{Pm}{Pa}\right)^{\frac{\gamma-1}{\gamma}}\right)}$$

In the above equations,
Pa: atmospheric pressure (Pa), Pm: manifold pressure (Pa),
Ta: outside air temperature (K), and At: throttle opening area ($m^2$).

Thereby, in order to keep air flow amount Qth (t) constant even if the operating characteristic of intake valve 105 is changed (from state 0 to state 1), the following equation (11) is required to be established.

$$\frac{At0 \cdot Pa}{\sqrt{R \cdot Ta}} \left(\frac{Pm0}{Pa}\right)^{\frac{1}{\gamma}} \sqrt{\frac{2\gamma}{\gamma-1}\left(1-\left(\frac{Pm0}{Pa}\right)^{\frac{\gamma-1}{\gamma}}\right)} = \tag{11}$$

$$\frac{At1 \cdot Pa}{\sqrt{R \cdot Ta}} \left(\frac{Pm1}{Pa}\right)^{\frac{1}{\gamma}} \sqrt{\frac{2\gamma}{\gamma-1}\left(1-\left(\frac{Pm1}{Pa}\right)^{\frac{\gamma-1}{\gamma}}\right)}$$

In the above equation,
Pm0: intake manifold pressure at standard valve operating characteristic,
Pm1: intake manifold pressure at the time when VEL operates,
At0: throttle opening area at standard valve operating characteristic, and
At1: throttle opening area at the time when VEL operates.

Accordingly, intake valve opening based correction value KAVEL is represented by the following equation (12).

$$KAVEL = \frac{At1}{At0} = \frac{\left(\frac{Pm0}{Pa}\right)^{\frac{1}{\gamma}} \sqrt{\left(1-\left(\frac{Pm0}{Pa}\right)^{\frac{\gamma-1}{\gamma}}\right)}}{\left(\frac{Pm1}{Pa}\right)^{\frac{1}{\gamma}} \sqrt{\left(1-\left(\frac{Pm1}{Pa}\right)^{\frac{\gamma-1}{\gamma}}\right)}} \tag{12}$$

Figure 20:
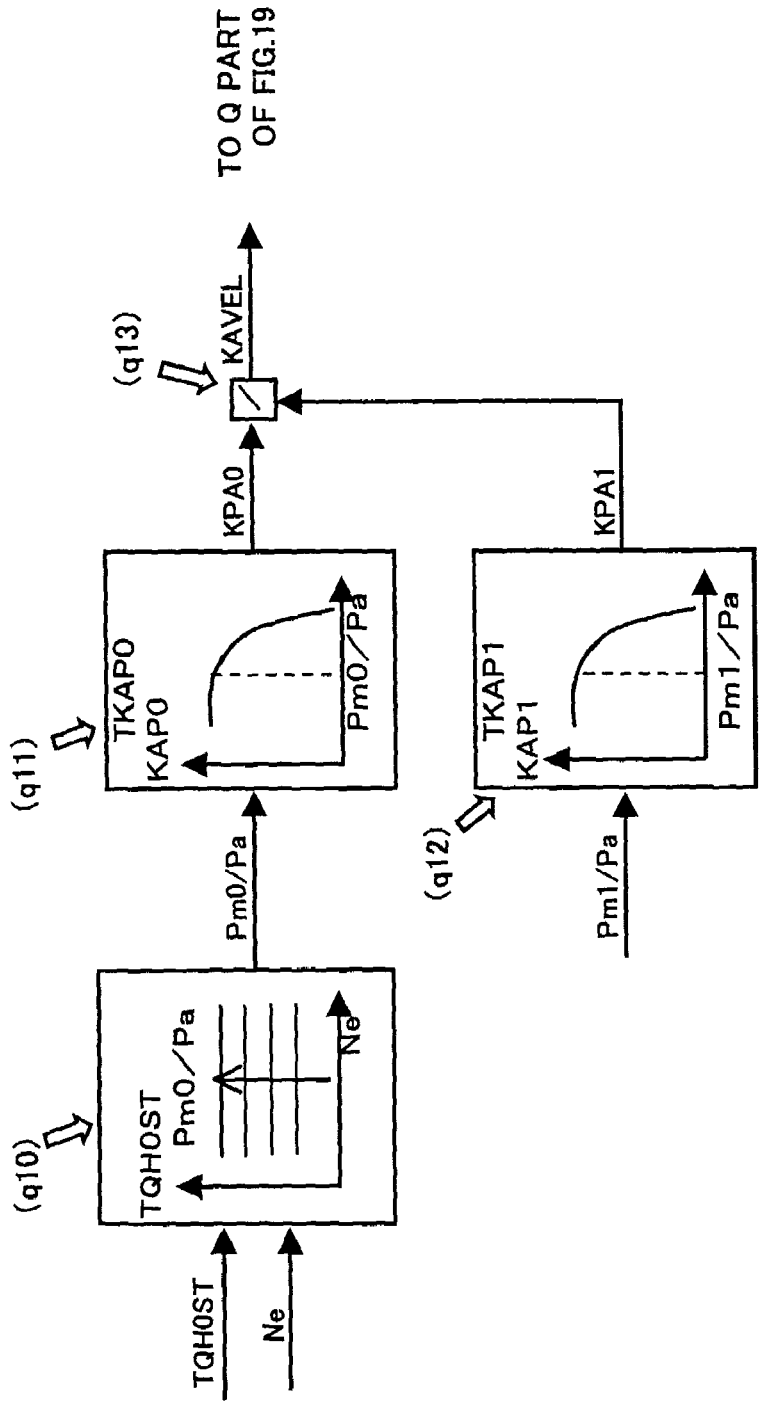
FIG. 20 is a block diagram showing the calculation of an intake valve opening based correction value KAVEL.

Therefore, in the embodiment, at q10 part in FIG. 20, a pressure ratio (Pm0/Pa) at standard valve operating characteristic is obtained by referring to a map previously allotted in performance, based on target volume flow ratio TQH0ST and engine rotation speed Ne.

Then, at q11 part, a coefficient KAP0 is calculated by retrieving a table TBLKAP0 previously set, based on the pressure ratio (Pm0/Pa) at standard valve operating characteristic. Note, this table TKPA0 is set by calculating in advance the following equation (13) and coefficient KPA0 corresponds to the numerator in the equation (12).

$$KAP0 = \left(\frac{Pm0}{Pa}\right)^{\frac{1}{\gamma}} \sqrt{\left(1 - \left(\frac{Pm0}{Pa}\right)^{\frac{\gamma-1}{\gamma}}\right)} \quad (13)$$

On the other hand, at q12 part, a coefficient KAP1 is calculated by retrieving a table TBLKAP1 previously set, based on the pressure ratio (Pm1/Pa) at the time when VEL 112 operates. Note, this table TKPA1 is set by calculating in advance the following equation (14) and coefficient KPA1 corresponds to the denominator in the equation (12).

$$KAP1 = \left(\frac{Pm1}{Pa}\right)^{\frac{1}{\gamma}} \sqrt{\left(1 - \left(\frac{Pm1}{Pa}\right)^{\frac{\gamma-1}{\gamma}}\right)} \quad (14)$$

The calculation of the pressure ratio (Pm1/Pa) at the time when VEL 112 operates will be described later (refer to FIG. 21).

Then, at q13 part, by dividing coefficient KAP0 by coefficient KAP1, intake valve opening based correction value KAVEL is calculated to be output to Q part of FIG. 19.

(d-3) Calculation of Pressure Ratio (Pm1/Pa) at the Time when VEL Operates

Pressure ratio (Pm1/Pa) at the time when VEL 112 operates, to be used at q12 part of FIG. 20, is calculated in the following manner.

Firstly, an air amount (actual intake air amount) Qacyl sucked into cylinder can be represented by the following equation (15) assumed that a new air rate is η.

$$Qacyl = \frac{VOL}{R \cdot Ta} \cdot \eta \cdot Pm1 \quad (15)$$

Thus, pressure ratio (Pm1/Pa) becomes the following.

$$\frac{Pm1}{Pa} = \frac{Qacyl \cdot R \cdot Ta}{VOL \cdot \eta \cdot Pa} = \frac{TP}{\eta} \cdot \frac{R \cdot Ta}{VOL \cdot Pa} = \frac{TP}{\eta \cdot TP100} \quad (16)$$

In the above equation, "TP" is an air amount (actual intake air amount) Qacyl sucked in the cylinder, "TP100" is an air amount sucked into the cylinder at the time when throttle valve 103b is fully opened and is calculated by TP100=(VOL·Pa)/(R·Ta).

Further, "VOL" is an effective cylinder volume at each valve operating characteristic of intake valve 105.

Accordingly, by obtaining TP, TP100 and new air rate η, pressure ratio (Pm1/Pa) at the time when VEL operates can be calculated without the necessity of detecting intake manifold pressure Pm.

Figure 21:
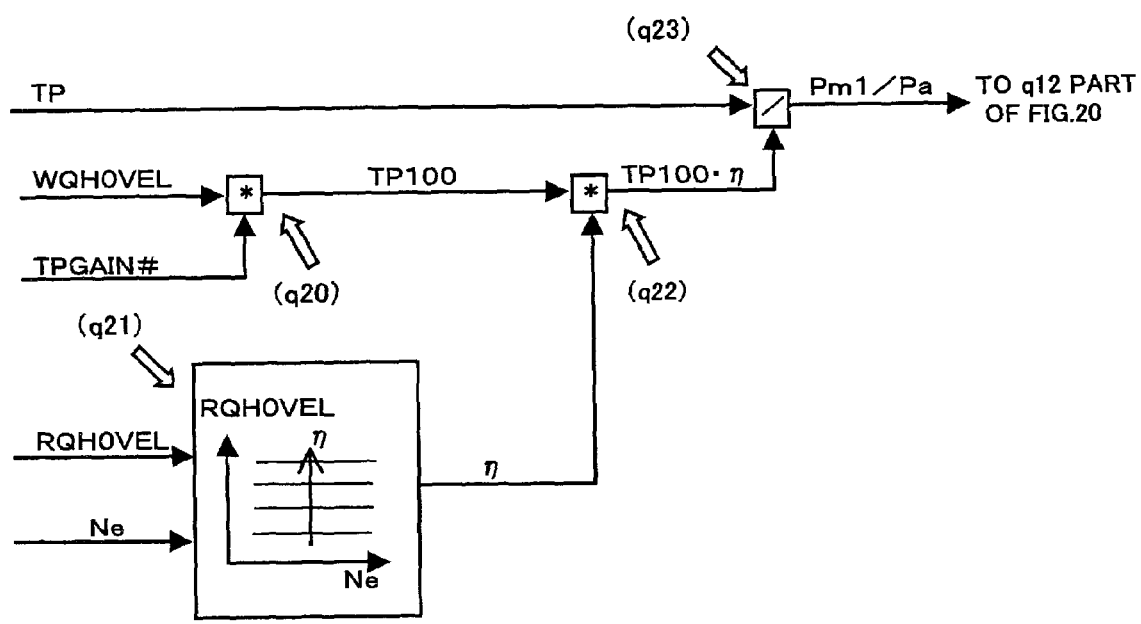
FIG. 21 is a block diagram showing the calculation of a pressure ratio (Pm1/Pa) at the time when the VEL operates.

Therefore, in the embodiment, at q20 part of FIG. 21, a conversion constant TPGAIN# is multiplied on a ratio WQH0VEL of volume flow passed through intake valve 105 (as valve fully opened time volume flow ratio) at each operating characteristic of intake valve 105 at the time when throttle valve 103b is fully opened, to calculate TP100. The calculation of valve fully opened time volume flow ratio WQH0VEL will be described later (refer to FIG. 22).

Further, at q21 part, new air rate η is calculated by referring to a map previously allotted in performance, based on a ratio RQH0VEL of volume flow passed through intake valve 105 (actual engine volume flow ratio) at each actual operating characteristic and engine rotation speed Ne. The calculation of actual engine volume flow ratio RQH0VEL will be described later. However, new air rate η is not limited to the one calculated as above, and may be estimated based on operating conditions, for example.

Then, at q22 part, "TP100·η" is calculated, and further, at q23 part, "TP/(TP100·η)" (as described above, this value is pressure ratio (Pm1/Pa) at the time when VEL operates) is calculated to be output to q12 part of FIG. 20. However, at choke time, valve upstream pressure based correction value KMANIP (that is, a constant) may be output (refer to the equation (7)).

Figure 22:
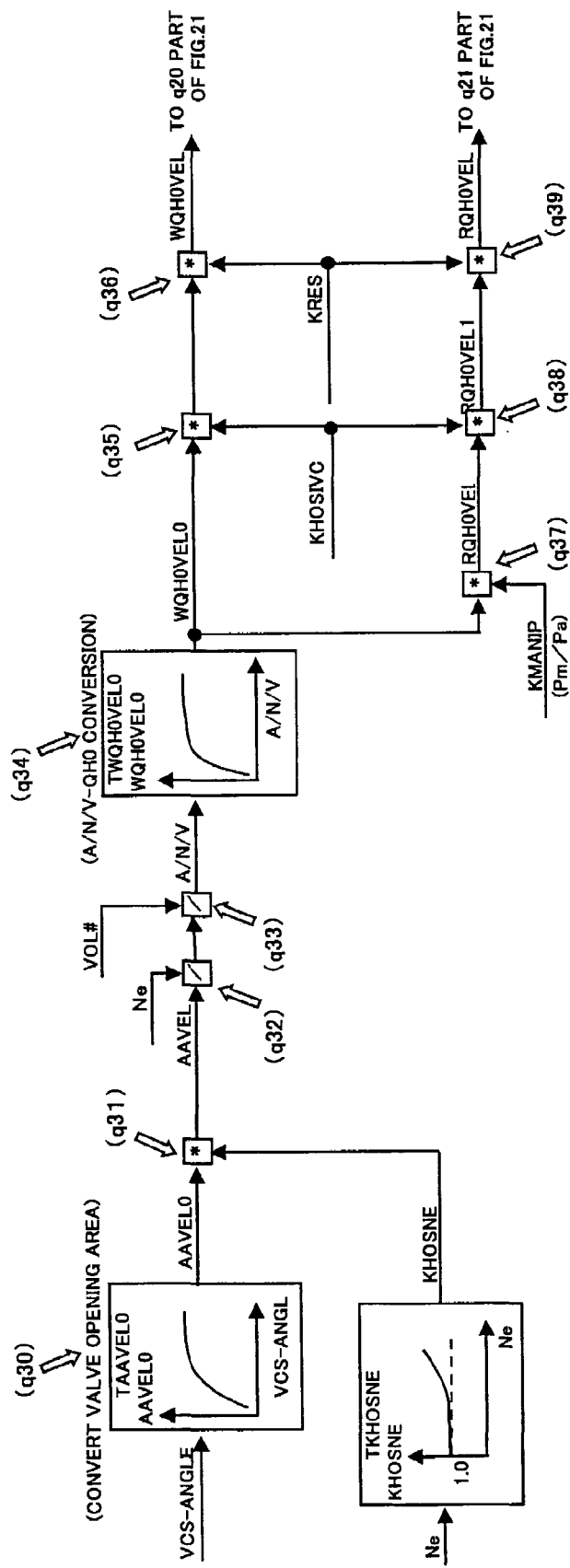
FIG. 22 is a block diagram showing the calculation of a valve fully opened time volume flow ratio WQH0VEL and an actual engine volume flow ratio RQH0VEL.

(d-4) Calculations of Valve Fully Opened Time Volume Flow Ratio WQH0VEL and Actual Engine Volume Flow Ratio RQH0VEL These calculations are performed by obtaining the opening area of intake valve 105 based on operating angle (VCS-ANGL) of VEL 112 and converting the opening area to the volume flow ratio. FIG. 22 shows a control block diagram.

In FIG. 22, at q30 part, an opening area AAVEL0 of intake valve 105 is calculated by retrieving a table TAAVEL0 previously set, based on operating angle (VCS-ANGL) of VEL 112.

At q31 part, in the same manner as H part in FIG. 12, VEL opening area is rotatingly corrected according to engine rotation speed Ne, to calculate AAVEL.

Calculated AAVEL is divided by engine rotation speed Ne at q32 part, and further divided by discharge amount (cylinder volume) VOL# at q33 part, to be made an A/N/V characteristic.

At q34 part, a table TWQH0VEL0 previously set is retrieved, to convert the A/N/V characteristic into WQH0VEL0.

Then, at q35 part, in the same manner as C part in FIG. 12, the IVC based correction is executed on WQH0VEL0, and subsequently, at q36 part, in the same manner as D part in FIG. 12, the residual gas based correction is executed on WQH0VEL0, to calculate valve fully opened time volume flow ratio WQH0VEL, and the resultant is output to q20 part in FIG. 19.

On the other hand, at q37 part, in the same manner as B part in FIG. 12, the valve upstream pressure based correction is executed on WQH0VEL0 converted at q34 part to obtain RQH0VEL0, and further, at q38 part, the IVC based correction is executed on RQH0VEL0, to calculate basic actual engine volume flow ratio RQH0VEL1 (this value corresponds to the actual intake air amount used for the calculation of basic residual gas amount Wcyl in FIG. 15).

Then, at q39 part, the residual gas based correction is executed, to calculate actual engine volume flow ratio RQH0VEL, and the resultant is output to q21 part in FIG. 21.

As described in the above, in this embodiment, by controlling electronically controlled throttle 104 to a request of negative pressure which cannot be responded only by VEL, while realizing the intake air amount control mainly by VEL 112, it is possible to realize an optimum control (a cooperative control in which VEL 112 and electronically controlled throttle 104 are cooperative with each other) according to the operating condition. Further, the control of VTC 113 is also performed, thereby achieving the reduction of NOx.

Moreover, when performing the intake air amount control mainly by VEL 112, since the (total) valve opening area is taken into consideration, it is possible to estimate with high accuracy residual gas amount W (residual gas rate RES) corresponding to a change in valve lift amount of intake valve 105, and also since a target valve operating characteristic of intake valve 105 is set considering this residual gas amount, it is possible to perform the intake air amount control with high accuracy.

Estimated residual gas amount W may be used for controls other than the intake air amount control, and further, VEL 112 is not limited to the above constitution.

Figure 23:
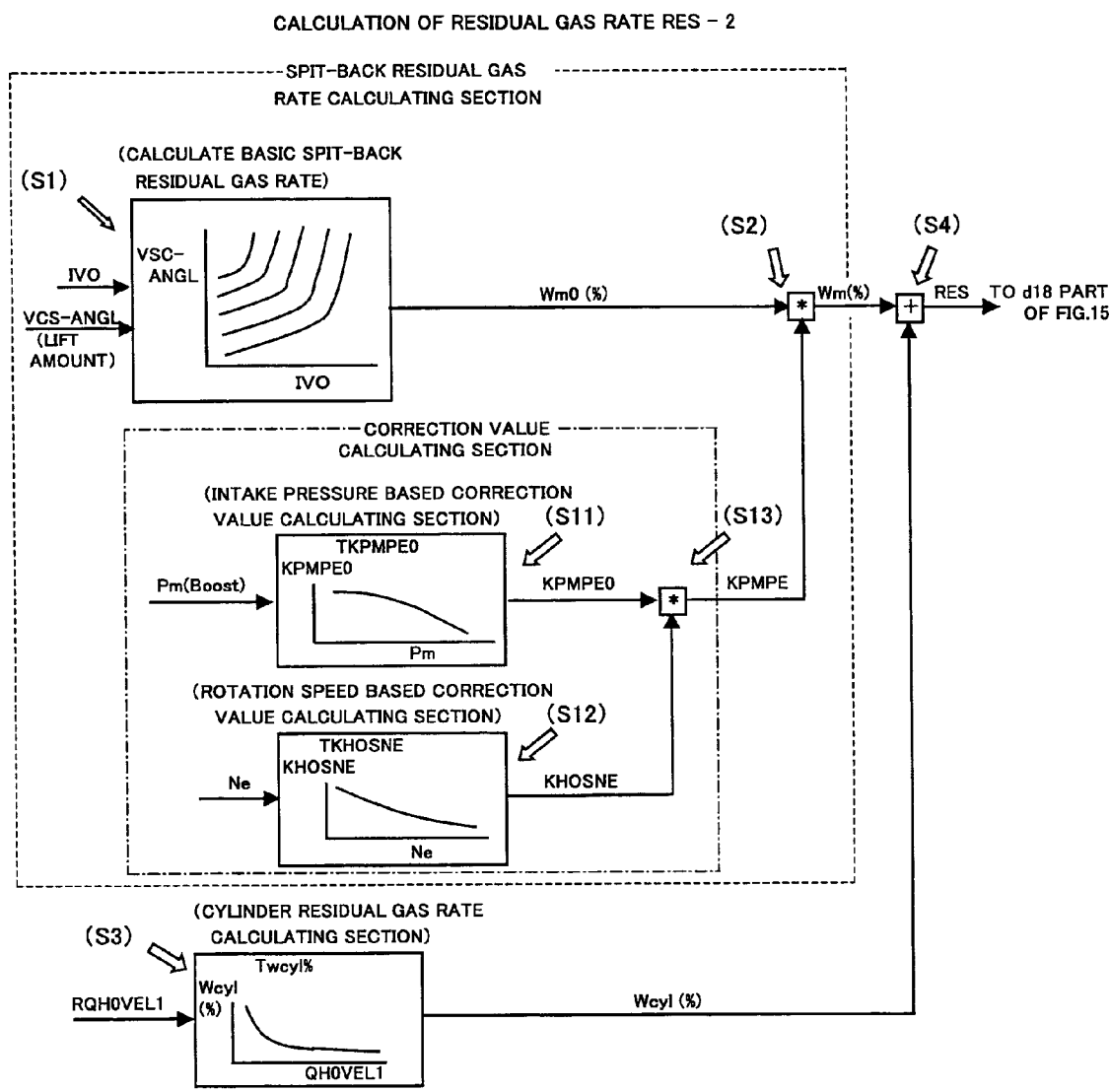
FIG. 23 is a block diagram showing the setting of the residual gas based correction value KRES (calculation of the residual gas amount).
Figure 24:
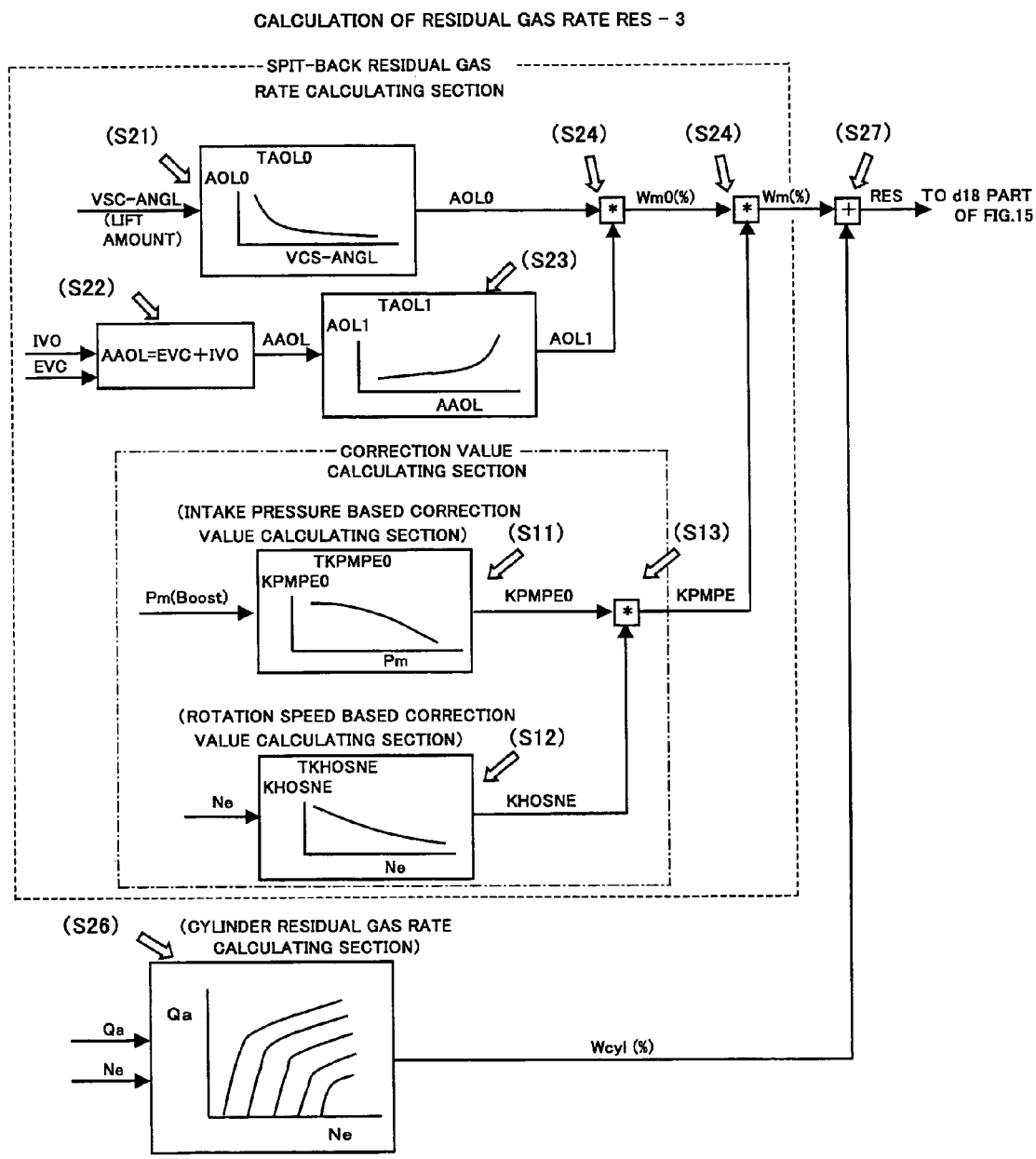
FIG. 24 is a block diagram showing the setting of the residual gas based correction value KRES (calculation of the residual gas amount).
Figure 25:
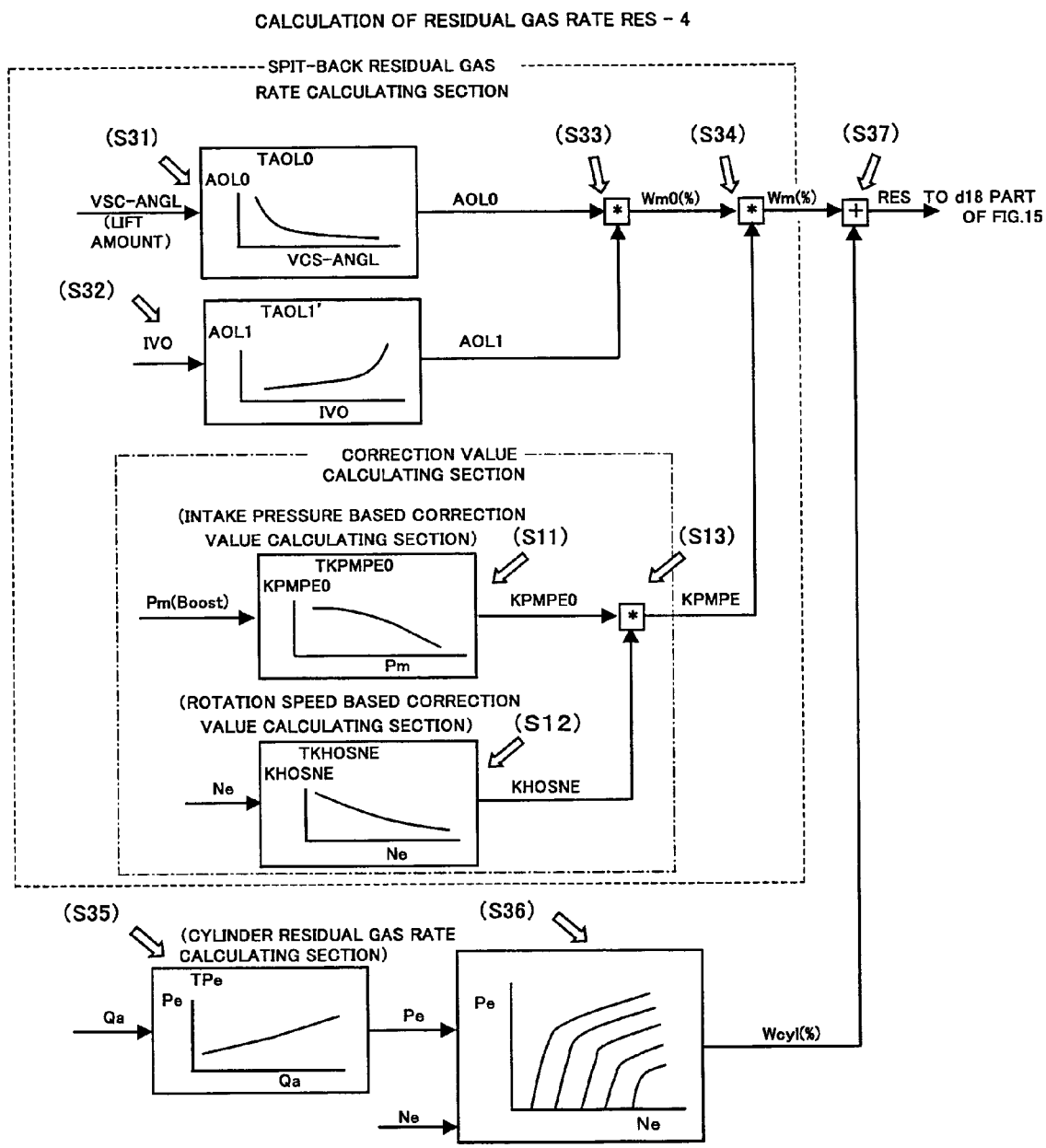
FIG. 25 is a block diagram showing the setting of the residual gas based correction value KRES (calculation of the residual gas amount).

Next, the other calculation methods of residual gas rate RES (corresponding to d10 part to d17 part of FIG. 15) are shown in FIG. 23 to FIG. 25. The calculation procedures will be described in sequence as follows.

In FIG. 23, based on opening timing IVO and valve lift amount of intake valve 105, residual gas rate Wm (%) due to the spit-back gas (a proportion of gas amount remained in the cylinder due to the spit-back, to the total cylinder gas amount, to be referred to hereunder, as a spit-back residual gas rate) is calculated, and residual gas rate Wcyl (%) due to basic residual gas (to be referred to hereunder, as a basic residual gas rate) is calculated based on basic actual engine volume flow ratio RQH0VEL1. The calculation resultants are added together, to calculate (estimate) residual gas rate RES due to total residual gas W.

In FIG. 23, at S1 part, by referring to a map based on opening timing IVO of intake valve 105 and operating angle VCS-ANGL of VEL 112, spit-back residual gas rate (basic spit-back residual gas rate) Wm0 (%) in the reference condition during the valve overlap time (refer to the description of d11 part of FIG. 15) is calculated.

At S2 part, basic spit-back residual gas rate Wm0 is corrected by being multiplied by a correction value KPMEPE (S13 part) calculated by multiplying an intake pressure based correction value KPMPE0 (S11 part) and a rotation speed based correction value KHOSNE (S12 part), to be set as spit-back residual gas rate Wm (%) (in the same manner as in d12 part and d13 part of FIG. 15).

On the other hand, at S3 part, by referring to a table TWcyl (%) based on basic actual engine volume flow ratio RQH0VEL1, basic residual gas rate Wcyl (%) is calculated. In this embodiment, the basic residual gas "rate" is obtained instead of the basic residual gas "amount". Therefore, since the influence by rotation speed Ne is small, the rotation speed based correction as shown in d15 part of FIG. 15 is not executed.

Then, at S4 part, spit-back residual gas rate Wm (%) and basic residual gas rate Wcyl (%) are added together, and the resultant is set as residual gas rate RES. According to this method, too, residual gas rate RES can be estimated (calculated). If this residual gas rate RES is output to d18 part of FIG. 15, the intake air amount control as described above can be realized.

In FIG. 24, spit-back residual gas rate Wm (%) is calculated based on the spit-back residual gas rate according to the valve lift amount of intake valve 105 and the spit-back residual gas rate according to the valve overlap amount of intake valve 105, and basic residual gas rate Wcyl (%) is calculated based on intake air amount Qa detected by air flow meter 117 and engine rotation speed Ne. The resultants are added together to calculate (estimate) residual gas rate RES.

In FIG. 24, at S21 part, a table TAOL0 is retrieved based on operating angle VCS-ANGL of VEL 112, to calculate a basic spit-back residual gas rate (a first basic spit-back residual gas rate) AOL0 according to the valve lift amount.

At S22 part, a valve overlap amount AAOL is calculated based on opening timing IVO of intake valve 105 and closing timing EVC (constant in this embodiment) of exhaust valve 107.

At S23 part, a table TAOL1 is retrieved based on calculated valve overlap amount AAOL, to calculate a spit-back residual gas rate (a second basic spit-back residual gas rate) AOL1 according to the valve overlap amount.

Then, at S24 part, AOL0 and AOL1 are multiplied together, and the resultant is set as basic spit-back residual gas rate Wm0 (%). At S25 part, in the same manner as in S2 part of FIG. 23, the intake pressure based correction and the rotation speed based correction are executed on basic spit-back residual gas rate Wm0 (%), and the resultant is set as spit-back residual gas rate Wm (%).

On the other hand, at S26 part, a map is referred to, based on intake air amount (new air amount) Qa and engine rotation speed Ne, to calculate basic residual gas rate Wcyl (%).

Then, at S27 part, spit-back residual gas rate Wm (%) and basic residual gas rate Wcyl (%) are added together, and the resultant is set as residual gas rate RES. According to this method, too, residual gas rate RES can be estimated (calculated). If this residual gas rate RES is output to d18 part of FIG. 15, the intake air amount control as described above can be realized.

In FIG. 25, spit-back residual gas rate Wm (%) is calculated based on the spit-back residual gas rate according to the valve lift amount of intake valve 105 and the spit-back residual gas rate according to opening timing IVO of intake valve 105 (since the operating characteristic of exhaust valve 107 is constant, this calculation has the same meaning as the calculation of the valve overlap amount), and basic residual gas rate Wcyl (%) is calculated based on an exhaust pressure Pe and engine rotation speed Ne. The resultants are added together to calculate (estimate) residual gas rate RES.

In FIG. 25, at S31 part, table TAOL0 is retrieved based on operating angle VCS-ANGL of VEL 112, to calculate first basic spit-back residual gas rate AOLO according to the valve lift amount.

At S32 part, a table TAOL1' is retrieved based on opening timing IVO of intake valve 105, to calculate a spit-back residual gas rate basic value AOL1' according to opening timing IVO (the valve overlap amount).

Then, at S33 part, AOL0 and AOL1' are multiplied together and the resultant is set as basic spit-back residual gas rate Wm0 (%). At S34 part, the intake pressure based correction and the rotation speed based correction are executed on basic spit-back residual gas rate WM0 (%), and the resultant is set as spit-back residual gas rate Wm (%).

On the other hand, at S35 part, a table TPe is referred to, based on intake air amount (new air amount) Qa, to calculate exhaust pressure Pe.

At S36 part, a map is referred to, based on exhaust pressure Pe and engine rotation speed Ne, to calculate basic residual gas rate Wcyl (%). Note, exhaust pressure Pe may be directly detected.

Then, at S37 part, spit-back residual gas rate Wm (%) and basic residual gas rate Wcyl (%) are added together, and the resultant is set as residual gas rate RES. According to this method, too, residual gas rate RES can be estimated (calculated). If this residual gas rate RES is output to d18 part of FIG. 15, the intake air amount control as described above can be realized.

Note, the constitution may be such that the calculations of spit-back residual gas rate Wm (%) and the calculations of basic residual gas rate Wcyl (%) described in FIG. 23 to FIG. 25 are appropriately combined, to calculate residual gas rate RES (residual gas based correction value KRES).

(Second Embodiment)

Figure 26:
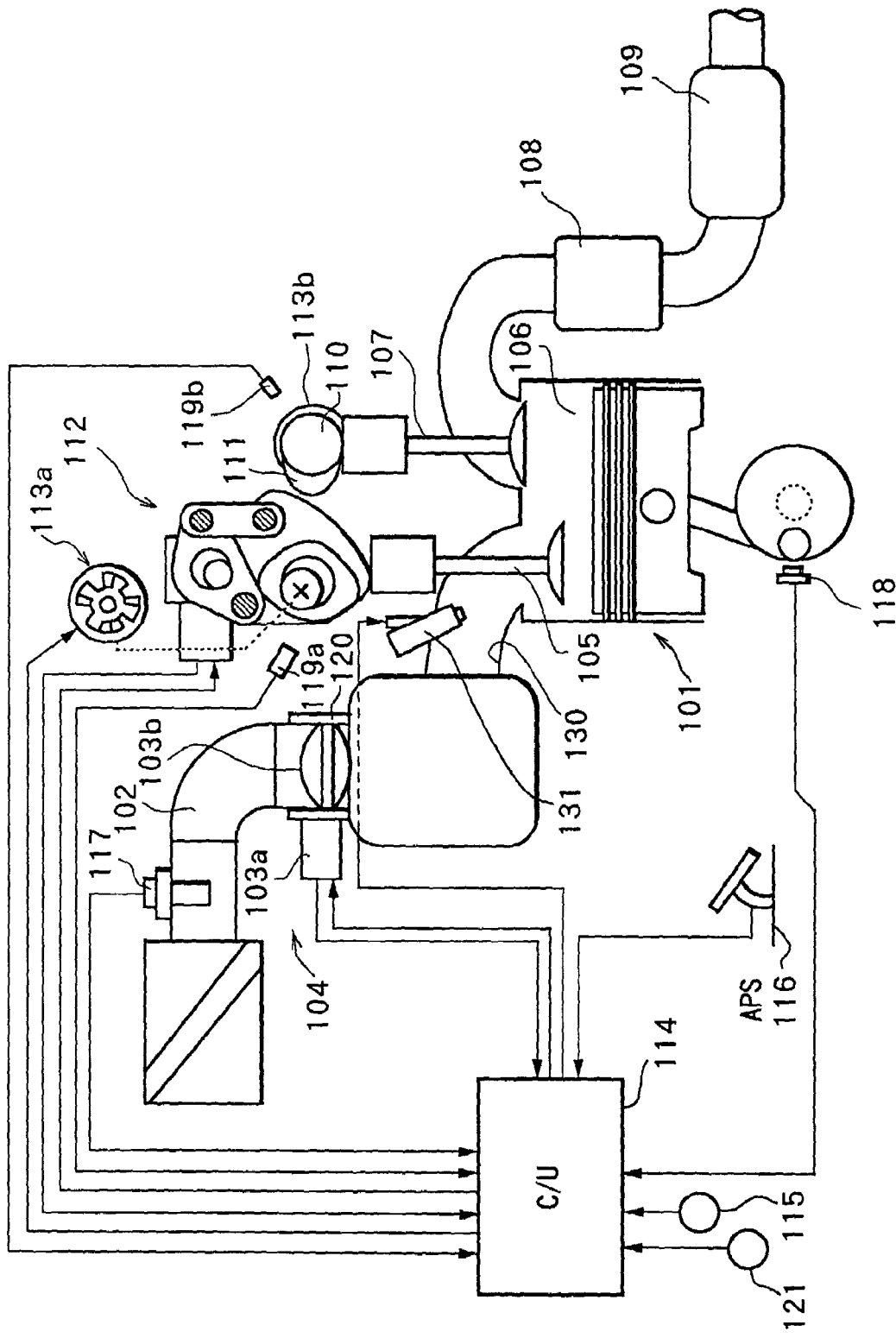
FIG. 26 is a view showing a system structure of an internal combustion engine in a second embodiment of the present invention.

FIG. 26 is a structural diagram of an internal combustion engine for vehicle according to a second embodiment of the present invention. The difference of the second embodiment from the first embodiment is in that valve timing of exhaust valve 107 is also continuously varied by a VTC (Valve Timing Control mechanism) 113$b$ serving as a variable valve mechanism, and a cam sensor 119$b$ detecting a rotation position (phase angle) of exhaust side camshaft 110 is disposed. Accordingly, C/U 114 also controls VTC 113$b$ on the exhaust valve 107 side.

In FIG. 26, same components as those in FIG. 2 are denoted by same numerals, and the description thereof is omitted. As shown in FIG. 26, a VTC and a cam sensor on the intake side are denoted by 113$a$ and 119$a$, respectively.

The intake air amount control to be executed by C/U 114 in the second embodiment is basically the same as that in the first embodiment. However, since the processes of (b-4) setting of residual gas based correction value KRES (estimation of residual gas amount W) and (c) calculation in VTC target phase angle calculating section "c" in the second embodiment are different from those in the first embodiment, the description will be made on only these processes.

(b-4-2) Setting of Residual Gas Based Correction Value KRES

In this embodiment, as in the first embodiment (FIG. 15), spit-back gas amount Wm during the valve overlap time and cylinder residual gas amount Wcyl are calculated, and the resultants are added together, to be set as total residual gas amount W. Then, residual gas rate RES (=W/(Qa+W)) is calculated, and a table is retrieved based on this residual gas rate RES, to calculate residual gas based correction value KRES.

Figure 27:
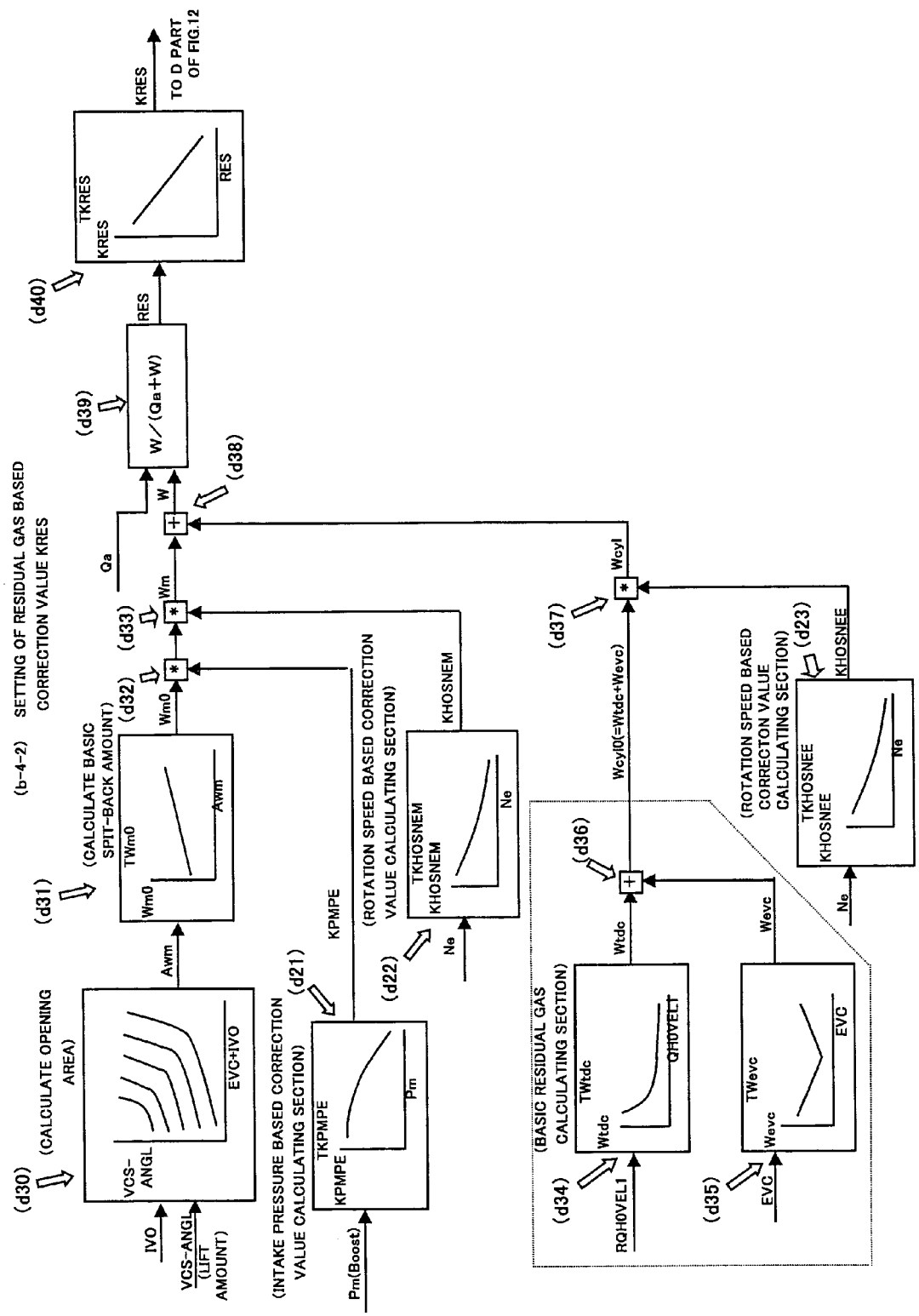
FIG. 27 is a block diagram showing the setting of the residual gas based correction value KRES (calculation of the residual gas amount).

Note, as shown by a broken lined block in a control block diagram in FIG. 27, when calculating basic residual gas amount Wcyl, a variation portion according to closing timing EVC of exhaust valve 107 is taken into consideration.

In FIG. 27, at d34 part, a table TWtdc previously set is retrieved based on basic actual engine volume flow amount RQH0VEL1, to calculate a residual gas amount Wtdc at the time when exhaust vale 107 is at reference closing timing (for example, at most advanced) in the reference condition (refer to the description of d11 part of FIG. 15).

At d35 part, a table TWevc is retrieved based on actual closing timing EVC of exhaust valve 107, to calculate a residual gas amount variation portion (an increase portion) Wevc according to closing timing EVC. This calculation is for taking into consideration a change in effective cylinder volume, which is determined by a piston position in closing timing EVC of exhaust valve 107, (and a change in residual gas amount with this change in effective cylinder volume).

At d36 part, residual gas variation portion Wevc is added to residual gas amount Wtdc at the time when exhaust valve 107 is at reference closing timing EVC, and the resultant is set as cylinder residual gas amount Wcyl0 (=Wtdc+Wevc) in the reference condition.

Then, at d37 part, in the same manner as in d23 part of FIG. 15, the rotation speed based correction is executed on cylinder residual gas amount Wcyl0 in the reference condition, to calculate basic residual gas amount Wcyl. Note, this rotation speed based correction is the same as that in d23 part of FIG. 15.

At d38 part, basic residual gas amount Wcyl is added to spit-back gas amount Wm calculated at d30 part to d33 part (same as d10 pat to d13 part of FIG. 15), to calculate total residual gas amount W. At d39 part, residual gas rate RES (=W/(Qa+W)) is calculated, and at d40 part, table TKRES is retrieved based on residual gas rate RES, to calculate residual gas based correction value KRES (which is output to D part of FIG. 12).

Thus, in this embodiment, when estimating (calculating) total residual gas amount W, since closing timing EVC of exhaust valve 107 is taken into consideration, it is possible to calculate with high accuracy basic residual gas amount Wcyl, which is varied with the change in effective cylinder volume, thereby enabling to estimate with high accuracy total residual gas amount W.

Note, residual gas amount W estimated in this embodiment may also be used for controls other than the intake air amount control. Further, a correction according to closing timing of exhaust valve 107 may be executed on the calculation of residual gas rate RES (residual gas based correction value KRES) shown in FIG. 23 to FIG. 25 described in the first embodiment.

(c-2) Calculation in VTC Target Angle Calculating Section "c"

Figure 28:
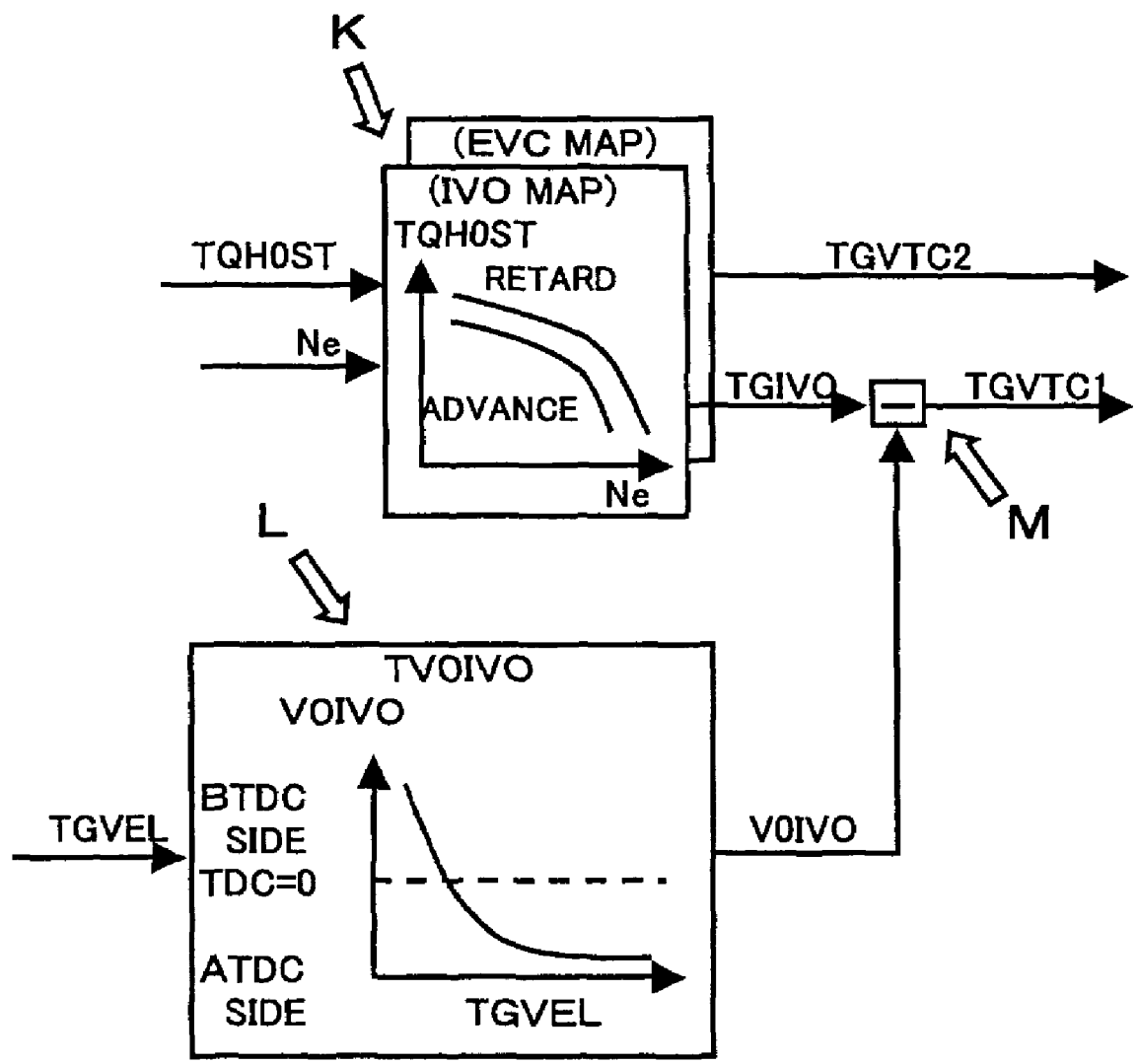
FIG. 28 is a block diagram showing the calculation of the target operating angle of the VTC.

FIG. 28 shows a control block diagram.

In FIG. 28, at K2 part, target opening timing TGIVO of intake valve 105 is calculated, referring to IVO map and EVC map previously set, based on target volume flow ratio TG0HST and engine rotation speed Ne, and target closing timing TGEVC of exhaust valve 107 is calculated to set a target operating angle (target VTC operating angle) TGVTC2.

At L2 part, table TV0IVO previously set is retrieved based on VEL target operating angle TGVEL (refer to FIG. 12), to calculate opening timing V0IVO of intake valve 105 at the VTC most retarded time in the case where VEL 112 is controlled at VEL target operating angle TGVEL.

At M2 part, opening timing V0IVO at the VTC most retarded time is subtracted from target opening timing TGIVO, to calculate a target operating angle TGVTC1 of intake valve 105 (a VTC target operating angle) considering the case where VEL 112 is controlled at VEL target operating angle TGVEL.

Then, C/U 114 controls VTC 113$a$ and VTC 113$b$ on the intake and exhaust sides, respectively, so that actual VTC operating angles (VTCNOW1 and VTCNOW2) of intake valve 105 and exhaust valve 107 reach VTC target operating angles TGVTC1 and TGVTC2, respectively.

In this embodiment, too, it is possible to control with high accuracy electronically controlled throttle 104, VEL 112, and VTC 113$a$ and VTC 113$b$ according to the operating condition, thereby realizing the intake air amount control (reduction of request of negative pressure or NOx) mainly by VEL 112.

(Third Embodiment)

The entire structure in this embodiment is the same as that in the second embodiment (FIG. 26), and the description thereof will be omitted. Further, the intake air amount control executed by C/U 114 is basically the same as that in the second embodiment. However, since the setting of residual gas based correction value KRES in this embodiment is different from that in the second embodiment, the description will be made on only this setting.

(b-4-3) Setting of Residual Gas Based Correction Value KRES

In this embodiment, in the same manner as in the first embodiment (FIG. 15) and the second embodiment (FIG. 27), spit-back gas amount Wm during the valve overlap time and cylinder residual gas amount Wcyl are calculated, and the calculation resultants are added together to be set as total residual gas amount W. Then, residual gas rate RES (W/(Qa+W)) is calculated, and a table is retrieved based on this residual gas rate RES to set residual gas based correction value KRES.

The setting of residual gas based correction value KRES will be described in accordance with a control block diagram in FIG. 29.

Figure 29:
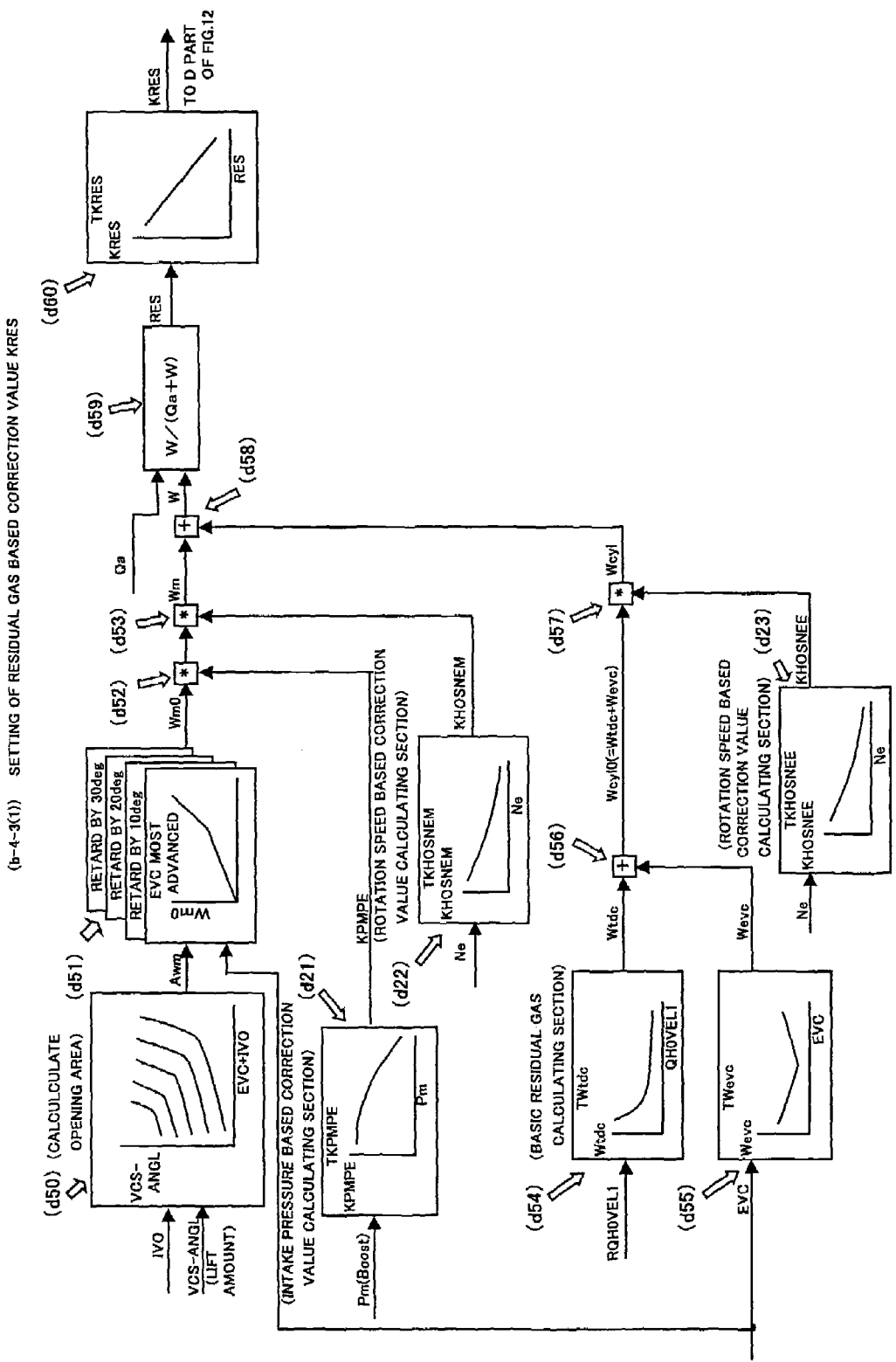
FIG. 29 is a block diagram showing the setting of the residual gas based correction value KRES (calculation of the residual gas amount).

In FIG. 29, at d50 part, a map previously set is referred to, based on opening timing IVO of intake valve 105 and operating angle VCS-ANGL (valve lift amount) of VEL 112, to calculate valve opening area AWm the valve overlap time.

Note, valve opening area AWm is stored in a map in advance as a value of the case where closing timing EVC of exhaust valve 107 is fixed at reference timing.

At d51 part, table TWm previously set is retrieved based on calculated valve opening area AWm, to calculate basic spit-back gas amount Wm0 during the valve overlap time.

A plurality of tables TWm is set for each closing timing EVC of exhaust valve 107. For example, two tables TWm most closest to closing timing EVC at the moment are selected and an interpolative operation is executed based on basic spit-back gas amounts Wm0 retrieved from selected tables TWm, respectively, to obtain basic spit-bak gas amount Wm0 corresponding to closing timing EVC.

This basic spit-back gas amount Wm0 is previously obtained as spit-back gas amount according to valve opening area AWm in the reference condition (refer to the description in d11 part of FIG. 15), and is a value estimated based on opening timing of intake valve 105, the valve lift amount of intake valve 105 and closing timing EVC of exhaust valve 107, in the reference condition.

Accordingly, basic spit-back gas amount Wm0 is estimated with high accuracy corresponding to a change in a period of valve overlap time determined based on opening timing IVO of intake valve 105 and closing timing EVC of exhaust valve 107, and further corresponding to a change in opening area due to a change in valve lift amount of intake valve 105.

Further, in a constitution shown in FIG. 29, a plurality of tables each converting valve opening area AWm into basic spit-back gas amount Wm0 during the valve overlap time is set for each closing timing EVC of exhaust valve 107, to obtain basic spit-back gas amount Wm0 corresponding to a change in closing timing EVC of exhaust valve 107. Instead, for example, as shown in FIG. 30, the estimation corresponding to closing timing EVC of exhaust valve 107 can be executed.

In an example shown in FIG. 30, at d51 part, valve opening area AWm is converted into basic spit-back gas amount Wm0 during the valve overlap time using one table TWm, while setting a correction value HOSRESE according to closing timing EVC of exhaust valve 107 at d51-1 part and adding correction value HOSRESE to basic spit-back gas amount Wm0, so that a correction corresponding to the change in closing timing EVC of exhaust valve 107 is executed on basic spit-back gas amount Wm0.

In this way, although estimation accuracy is lowered compared with the embodiment in FIG. 29, the constitution of estimation control can be simplified and the matching cost can be reduced.

In the case where VEL 112 is also provided on the exhaust valve 107 side, that is, in the case where the valve lift amount of exhaust valve 107 is also variably controlled, at d51 part of FIG. 28, a plurality of maps each obtaining basic spit-back gas amount Wm0 based on valve opening area AWm and the valve lift amount of exhaust valve 107, may be set for each closing timing EVC of exhaust valve 107. Further, at d51-2 part of FIG. 29, correction value HOSRESE may be set based on closing timing EVC and the valve lift amount of exhaust valve 107.

Then, at d52 part and d53 part, in the same manner as in d12 part and d13 part of FIG. 15, the intake pressure based correction and the rotation speed based correction are executed on basic spit-back gas amount Wm0, respectively, to calculate spit-back gas amount Wm.

On the other hand, at d54 part to d57 part, in the same manner as in the second embodiment (d34 part to d37 part of FIG. 27), basic residual gas amount Wcyl is calculated.

At d58 part, spit-back gas amount Wm and basic residual gas amount Wcyl are added together, to calculate total residual gas amount W.

At d59 part, based on total residual gas amount W and intake air amount (new air amount) Qa, residual gas rate RES (=W/(W+Qa)) is calculated.

Then, at d60 part, table TKRES previously set is retrieved based on calculated residual gas rate RES, to set residual gas based correction value KRES ($\leq 1$).

Thus, in this embodiment, when estimating (calculating) total residual gas amount W, it is possible to calculate with high accuracy spit-back gas amount Wm, which is varied due to valve opening area AWm, by taking into consideration opening timing IVO and valve lift amount (VCS-ANGL) of intake valve 105, and further closing timing EVC of exhaust valve 107.

Further, by taking into consideration closing timing EVC of exhaust valve 107, it is possible to calculate with high accuracy basic residual gas amount Wcyl, which is varied with the change in effective cylinder volume. Thereby, it becomes possible to estimate (calculate) with high accuracy total residual gas amount W, which is obtained by adding spit-back gas amount Wm and basic residual gas amount Wcyl.

Consequently, it is possible to control with higher accuracy electronically controlled throttle 104, VEL 112, and VTC 113a and VTC 113b according to the operating condition, thereby realizing the intake air amount control (reduction of request of negative pressure or NOx) mainly by VEL 112.

Note, residual gas amount W estimated in this embodiment may also be used for controls other than the intake air amount control. Further, a correction according to closing timing of exhaust valve 107 may be executed on the calculation of residual gas rate RES (residual gas based correction value KRES) shown in FIG. 23 to FIG. 25 described in the first embodiment.

The entire contents of Japanese Patent Application No. 2002-205877 filed Jul. 15, 2002, Japanese Patent Application No. 2002-205878 filed Jul. 15, 2002, and Japanese Patent Application No. 2002-346142 filed Nov. 28, 2002, priorities of which are claimed, are incorporated herein by reference.

What is claimed is:

1. An apparatus for estimating a residual gas amount of an internal combustion engine provided with a variable valve mechanism that varies at least an operating characteristic of an intake valve, comprising:
 a valve operating characteristic detecting unit that detects a valve operating characteristic which is varied by said variable valve mechanism;
 an actual intake air amount measuring unit that measures an actual intake air amount of said engine; and
 a residual gas amount calculating unit that calculates a valve opening area during a valve overlap time based on detected valve operating characteristic, and calculates a residual gas amount of the engine based on calculated valve opening area and said actual intake air amount of the engine.

2. An apparatus for estimating a residual gas amount of an internal combustion engine according to claim 1,
 wherein said residual gas amount calculating unit calculates said valve opening area during the valve overlap time based on opening timing and a valve lift amount of said intake valve.

3. An apparatus for estimating a residual gas amount of an internal combustion engine according to claim 1,
 wherein said residual gas amount calculating unit:
 calculates a basic residual gas amount based on said actual intake air amount of the engine,
 calculates a spit-back gas amount during the valve overlap time based on said valve opening area during the valve overlap time, and
 sets a resultant obtained by adding calculated spit-back gas amount at the valve overlap time to said basic residual gas amount, as said residual gas amount of the engine.

4. An apparatus for estimating a residual gas amount of an internal combustion engine according to claim 3,
 wherein said residual gas amount calculating unit:
 calculates a spit-back gas amount for when closing timing of an exhaust valve is made to be reference timing, based on said valve opening area during the valve overlap time, and
 sets a resultant obtained by correcting calculated spit-back gas amount according to actual closing timing of said exhaust valve, as said spit-back gas amount during the valve overlap time.

5. An apparatus for estimating a residual gas amount of an internal combustion engine according to claim 3,
 wherein said residual gas amount calculating unit:
 calculates a spit-back gas amount for when closing timing of an exhaust valve is made to be reference timing and a valve lift amount of said exhaust valve is made to be a reference valve lift amount, based on said valve opening area during the valve overlap time, and
 sets a resultant obtained by correcting calculated spit-back gas amount according to actual closing timing and an actual valve lift amount of said exhaust valve, as said spit-back gas amount during the valve overlap time.

6. An apparatus for estimating a residual gas amount of an internal combustion engine according to claim 3,
 wherein said residual gas amount calculating unit:
 calculates a residual gas amount for when closing timing of an exhaust valve is made to be reference timing, based on said actual intake air amount of the engine, and
 sets a resultant obtained by correcting calculated residual gas amount according to actual closing timing of said exhaust valve, as said basic residual gas amount.

7. An apparatus for estimating a residual gas amount of an internal combustion engine according to claim 1, further comprising:
 an operating condition detecting unit that detects an operating condition inclusive of an engine intake pressure or an engine rotation speed,
 wherein said residual gas amount calculating unit sets a resultant obtained by correcting a residual gas amount calculated when the operating condition of said engine is made to be a reference condition, according to at least one of an engine actual intake pressure and an engine actual rotation speed, as said residual gas amount of the engine.

8. An apparatus for estimating a residual gas amount of an internal combustion engine according to claim 1,
 wherein said actual intake air amount measuring unit calculates said actual intake air amount of the engine based on said valve operating characteristic of said intake valve.

9. An apparatus for estimating a residual gas amount of an internal combustion engine according to claim 1,
 wherein said actual intake air amount measuring unit comprises an intake air amount detecting sensor, and calculates said actual intake air amount of the engine based on a detection value of said intake air amount detecting sensor.

10. An apparatus for estimating a residual gas amount of an internal combustion engine according to claim 1,
 wherein said valve opening area is a total opening area of said intake valve and an exhaust valve.

11. An apparatus for estimating a residual gas amount of an internal combustion engine according to claim 1,
 wherein said valve opening area is an opening area of said intake valve.

12. An apparatus for estimating a residual gas amount of an internal combustion engine provided with a variable valve mechanism that varies at least an operating characteristic of an intake valve, comprising:
 valve operating characteristic detecting means for detecting a valve operating characteristic which is varied by said variable valve mechanism;
 actual intake air amount measuring means for measuring an actual intake air amount of said engine;
 valve opening area calculating means for calculating a valve opening area during a valve overlap time based on said valve operating characteristic; and
 residual gas amount calculating means for calculating a residual gas amount of the engine based on said actual intake air amount of the engine and said valve opening area during the valve overlap time.

13. A method of estimating a residual gas amount of an internal combustion engine provided with a variable valve mechanism that varies at least an operating characteristic of an intake valve,
 wherein a valve opening area during a valve overlap time is calculated based on a valve operating characteristic which is varied by said variable valve mechanism, and a residual gas amount of said engine is calculated based on calculated valve opening area and said actual intake air amount of the engine.

14. A method of estimating a residual gas amount of an internal combustion engine according to claim 13,
 wherein said valve opening area during the valve overlap time is calculated based on opening timing and a valve lift amount of said intake valve.

15. A method of estimating a residual gas amount of an internal combustion engine according to claim 13, wherein a basic residual gas amount is calculated based on said actual intake air amount of the engine, a spit-back gas amount during the valve overlap time is calculated based on said valve opening area during the valve overlap time, and a resultant obtained by adding calculated spit-back gas amount during the valve overlap time to said basic residual gas amount, is set as said residual gas amount of the engine.

16. A method of estimating a residual gas amount of an internal combustion engine according to claim 15, wherein a spit-back gas amount for when closing timing of an exhaust valve is made to be reference timing, is calculated based on said valve opening area during the valve overlap time, and a resultant obtained by correcting calculated spit-back gas amount according to actual closing timing of said exhaust valve, is set as said spit-back gas amount during the valve overlap time.

17. A method of estimating a residual gas amount of an internal combustion engine according to claim 15, wherein a spit-back gas amount for when closing timing of an exhaust valve is made to be reference timing and a valve lift amount of said exhaust valve is made to be a reference valve lift amount, is calculated based on said valve opening area during the valve overlap time, and a resultant obtained by correcting calculated spit-back gas amount according to actual closing timing and an actual valve lift amount of said exhaust valve, is set as said spit-back gas amount during the valve overlap time.

18. A method of estimating a residual gas amount of an internal combustion engine according to claim 15, wherein a residual gas amount for when closing timing of an exhaust valve is made to be reference timing, is calculated based on said actual intake air amount of the engine, and a resultant obtained by correcting calculated residual gas amount according to actual closing timing of said exhaust valve, is set as said basic residual gas amount.

19. A method of estimating a residual gas amount of an internal combustion engine according to claim 13, wherein a resultant obtained by correcting a residual gas amount calculated when the operating condition of said engine is made to be a reference condition, according to at least one of an engine actual intake pressure and an engine actual rotation speed, is set as said residual gas amount of the engine.

20. A method of estimating a residual gas amount of an internal combustion engine according to claim 13, wherein said actual intake air amount of the engine is calculated based on said valve operating characteristic of said intake valve.

21. A method of estimating a residual gas amount of an internal combustion engine according to claim 13, wherein said actual intake air amount of the engine is calculated based on a detection value of an intake air amount detecting sensor.

22. A method of estimating a residual gas amount of an internal combustion engine according to claim 13, wherein said valve opening area is a total opening area of said intake valve and an exhaust valve.

23. A method of estimating a residual gas amount of an internal combustion engine according to claim 13, wherein said valve opening area is an opening area of said intake valve.

24. An apparatus for controlling an intake air amount of an internal combustion engine provided with a variable valve mechanism that varies at least an operating characteristic of an intake valve, comprising:

an operating condition detecting unit that detects an operating condition of said engine;

an actual intake air amount measuring unit that measures an actual intake air amount of said engine;

a valve operating characteristic detecting unit that detects a valve operating characteristic which is varied by said variable valve mechanism; and a control unit that sets a target valve operating characteristic according to the operating condition of the engine, and controls said variable valve mechanism so that the valve operating characteristic of said intake valve reaches said target valve operating characteristic, wherein said control unit:

sets a target intake air amount equivalent to a target torque based on the operating condition of the engine, calculates a valve opening area during a valve overlap time based on detected valve operating characteristic, calculates a residual gas amount of said engine based on calculated valve opening area and said actual intake air amount of the engine, and sets said target valve operating characteristic based on said target intake air amount and said residual gas amount of the engine.

25. An apparatus for controlling an intake air amount of an internal combustion engine according to claim 24, wherein said control unit:

calculates a target volume flow ratio in said intake valve by dividing said target intake air amount by an engine rotation speed and total cylinder volume, corrects said target volume flow ratio according to said residual gas amount of the engine, and sets said target valve operating characteristic based on corrected target volume flow ratio.

26. An apparatus for controlling an intake air amount of an internal combustion engine according to claim 24, wherein said control unit calculates said valve opening area during the valve overlap time based on opening timing and a valve lift amount of said intake valve.

27. An apparatus for controlling an intake air amount of an internal combustion engine according to claim 24, wherein said control unit:

calculates a basic residual gas amount based on said actual intake air amount of the engine, calculates a spit-back gas amount during the valve overlap time based on said valve opening area during the valve overlap time, and sets a resultant obtained by adding calculated spit-back gas amount during the valve overlap time to said basic residual gas amount, as said residual gas amount of the engine.

28. An apparatus for controlling an intake air amount of an internal combustion engine according to claim 27, wherein said control unit:

calculates a spit-back gas amount for when closing timing of an exhaust valve is made to be reference timing, based on said valve opening area during the valve overlap time, and sets a resultant obtained by correcting calculated spit-back gas amount according to actual closing timing of said exhaust valve, as said spit-back gas amount during the valve overlap time.

29. An apparatus for controlling an intake air amount of an internal combustion engine according to claim 27, wherein said control unit:
calculates a spit-back gas amount for when closing timing of an exhaust valve is made to be reference timing and a valve lift amount of said exhaust valve is made to be a reference valve lift amount, based on said valve opening area during the valve overlap time, and
sets a resultant obtained by correcting calculated spit-back gas amount according to actual closing timing and an actual valve lift amount of said exhaust valve, as said spit-back gas amount during the valve overlap time.

30. An apparatus for controlling an intake air amount of an internal combustion engine according to claim 27,
wherein said control unit:
calculates a residual gas amount for when closing timing of an exhaust valve is made to be reference timing, based on said actual intake air amount of the engine, and
sets a resultant obtained by correcting calculated residual gas amount according to actual closing timing of said exhaust valve, as said basic residual gas amount.

31. An apparatus for controlling an intake air amount of an internal combustion engine according to claim 24, further comprising:
an operating condition detecting unit that detects an operating condition inclusive of an engine intake pressure or an engine rotation speed,
wherein said control unit sets a resultant obtained by correcting a residual gas amount calculated when the operating condition of said engine is made to be a reference condition, according to at least one of an engine actual intake pressure and an engine actual rotation speed, as said residual gas amount of the engine.

32. An apparatus for controlling an intake air amount of an internal combustion engine according to claim 24,
wherein said actual intake air amount measuring unit calculates said actual intake air amount of the engine based on said valve operating characteristic of said intake valve.

33. An apparatus for controlling an intake air amount of an internal combustion engine according to claim 24,
wherein said actual intake air amount measuring unit comprises an intake air amount detecting sensor, and calculates said actual intake air amount of the engine based on a detection value of said intake air amount detecting sensor.

34. An apparatus for controlling an intake air amount of an internal combustion engine according to claim 24,
wherein said valve opening area is a total opening area of said intake valve and an exhaust valve.

35. An apparatus for controlling an intake air amount of an internal combustion engine according to claim 24,
wherein said valve opening area is an opening area of said intake valve.

36. An apparatus for controlling an intake air amount of an internal combustion engine provided with a variable valve mechanism that varies at least an operating characteristic of an intake valve, comprising:
operating condition detecting means for detecting an operating condition of said engine;
actual intake air amount measuring means for measuring an actual intake air amount of said engine;
valve operating characteristic detecting means for detecting a valve operating characteristic which is varied by said variable valve mechanism; and
target intake air amount setting means for setting a target intake air amount equivalent to a target torque based on the operating condition of the engine;
residual gas amount calculating means for calculating a valve opening area during a valve overlap time based on the valve operating characteristic which is varied by said variable valve mechanism, and for calculating a residual gas amount of said engine based on calculated valve opening area and said actual intake air amount of the engine;
target valve operating characteristic setting means for setting a target valve operating characteristic based on said target intake air amount and said residual gas amount of the engine; and
variable valve mechanism control means for controlling said variable valve mechanism so that the valve operating characteristic of said intake valve reaches said target valve operating characteristic.

37. A method of controlling an intake air amount of an internal combustion engine provided with a variable valve mechanism that varies at least an operating characteristic of an intake valve, comprising:
setting a target intake air amount equivalent to a target torque based on an operating condition of said engine;
calculating a valve opening area during a valve overlap time based on the valve operating characteristic which is varied by said variable valve mechanism;
calculating a residual gas amount of said engine based on said valve opening area during the valve overlap time and an actual intake air amount of said engine;
setting a target valve operating characteristic based on said target intake air amount and said residual gas amount of the engine; and
controlling said variable valve mechanism so that the valve operating characteristic of said intake valve reaches said target valve operating characteristic.

38. A method of controlling an intake air amount of an internal combustion engine according to claim 37,
wherein a target volume flow ratio in said intake valve is calculated by dividing said target intake air amount by an engine rotation speed and total cylinder volume,
said target volume flow ratio is corrected according to said residual gas amount of the engine, and
said target valve operating characteristic is set based on corrected target volume flow ratio.

39. A method of controlling an intake air amount of an internal combustion engine according to claim 37,
wherein said valve opening area during the valve overlap time is calculated based on opening timing and a valve lift amount of said intake valve.

40. A method of controlling an intake air amount of an internal combustion engine according to claim 37,
wherein a basic residual gas amount is calculated based on said actual intake air amount of the engine,
a spit-back gas amount during the valve overlap time is calculated based on said valve opening area during the valve overlap time, and
a resultant obtained by adding calculated spit-back gas amount during the valve overlap time to said basic residual gas amount, is set as said residual gas amount of the engine.

41. A method of controlling an intake air amount of an internal combustion engine according to claim 40,
wherein a spit-back gas amount for when closing timing of an exhaust valve is made to be reference timing, is calculated based on said valve opening area during the valve overlap time, and a resultant obtained by correcting calculated spit-back gas amount according to actual closing timing of said exhaust valve, is set as said spit-back gas amount during the valve overlap time.

42. A method of controlling an intake air amount of an internal combustion engine according to claim 40,
wherein a spit-back gas amount for when closing timing of an exhaust valve is made to be reference timing and a valve lift amount of said exhaust valve is made to be a reference valve lift amount, is calculated based on said valve opening area during the valve overlap time, and
a resultant obtained by correcting calculated spit-back gas amount according to actual closing timing and an actual valve lift amount of said exhaust valve, is set as said spit-back gas amount during the valve overlap time.

43. A method of controlling an intake air amount of an internal combustion engine according to claim 40,
wherein a residual gas amount for when closing timing of an exhaust valve is made to be reference timing, is calculated based on said actual intake air amount of the engine, and
a resultant obtained by correcting calculated residual gas amount according to actual closing timing of said exhaust valve, is set as said basic residual gas amount.

44. A method of controlling an intake air amount of an internal combustion engine according to claim 37,
wherein a resultant obtained by correcting a residual gas amount calculated when the operating condition of said engine is made to be a reference condition, according to at least one of an engine actual intake pressure and an engine actual rotation speed, is set as said residual gas amount of the engine.

45. A method of controlling an intake air amount of an internal combustion engine according to claim 37,
wherein said actual intake air amount of the engine is calculated based on said valve operating characteristic of said intake valve.

46. A method of controlling an intake air amount of an internal combustion engine according to claim 37,
wherein said actual intake air amount of the engine is calculated based on a detection value of an intake air amount detecting sensor.

47. A method of controlling an intake air amount of an internal combustion engine according to claim 37,
wherein said valve opening area is a total opening area of said intake valve and an exhaust valve.

48. A method of controlling an intake air amount of an internal combustion engine according to claim 37,
wherein said valve opening area is an opening area of said intake valve.

* * * * *